(12) United States Patent
Lee et al.

(10) Patent No.: US 11,074,671 B2
(45) Date of Patent: Jul. 27, 2021

(54) ELECTRONIC APPARATUS AND CONTROL METHOD THEREOF

(71) Applicant: SAMSUNG ELECTRONICS CO., LTD., Suwon-si (KR)

(72) Inventors: Hyun-Seung Lee, Seoul (KR); Dong-Hyun Kim, Seongnam-si (KR); Young-Su Moon, Seoul (KR); Tae-gyoung Ahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/533,850

(22) Filed: Aug. 7, 2019

(65) Prior Publication Data

US 2019/0362467 A1 Nov. 28, 2019

Related U.S. Application Data

(63) Continuation-in-part of application No. 15/988,592, filed on May 24, 2018.
(Continued)

(30) Foreign Application Priority Data

Mar. 9, 2018 (KR) ........................ 10-2018-0027790

(51) Int. Cl.
*G06T 3/40* (2006.01)
*G06T 5/50* (2006.01)
*G06K 9/00* (2006.01)

(52) U.S. Cl.
CPC ............ *G06T 3/40* (2013.01); *G06K 9/00536* (2013.01); *G06T 5/50* (2013.01); *G06T 2207/20021* (2013.01); *G06T 2207/20081* (2013.01)

(58) Field of Classification Search
CPC .... H04N 19/117; H04N 19/46; G06T 3/4053; G06T 3/4076; G06K 9/66
See application file for complete search history.

(56) References Cited

U.S. PATENT DOCUMENTS 5,499,057 A 3/1996 Kondo et al.
6,323,905 B1 11/2001 Kondo et al.
(Continued)

FOREIGN PATENT DOCUMENTS

CN 106650786 A 5/2017
JP H07-115569 5/1995
(Continued)

OTHER PUBLICATIONS

Romano, Yaniv, John Isidoro, and Peyman Milanfar. "RAISR: rapid and accurate image super resolution." IEEE Transactions on Computational Imaging 3.1 (2016): 110-125. (Year: 2016).*
(Continued)

*Primary Examiner* — Vincent Rudolph
*Assistant Examiner* — Raphael Schwartz
(74) *Attorney, Agent, or Firm* — Nixon & Vanderhye P.C.

(57) ABSTRACT

An electronic apparatus is provided. The electronic apparatus includes: a storage configured to store a plurality of filters each corresponding to a plurality of image patterns; and a processor configured to classify an image block including a target pixel and a plurality of surrounding pixels into one of the plurality of image patterns based on a relationship between pixels within the image block and to obtain a final image block in which the target pixel is image-processed by applying at least one filter corresponding to the classified image pattern from among the plurality of filters to the image block, wherein the plurality of filters are obtained by learning, through an artificial intelligence algorithm, a relationship between a plurality of first sample
(Continued)

image blocks and a plurality of second sample image blocks corresponding to the plurality of first sample image blocks based on each of the plurality of image patterns.

16 Claims, 25 Drawing Sheets

Related U.S. Application Data

(60) Provisional application No. 62/599,936, filed on Dec. 18, 2017.

(56) References Cited

U.S. PATENT DOCUMENTS

| | | | |
|---|---|---|---|
| 7,483,565 | B2 | 1/2009 | Kondo et al. |
| 7,881,539 | B2 | 2/2011 | Kondo et al. |
| 8,086,587 | B2 | 12/2011 | Obana et al. |
| 8,861,881 | B2 | 10/2014 | Tate et al. |
| 9,813,738 | B2 | 11/2017 | Tsai et al. |
| 2006/0280380 | A1 | 12/2006 | Li |
| 2008/0013835 | A1 | 1/2008 | Kondo et al. |
| 2008/0292188 | A1* | 11/2008 | Ettan .................. G06K 9/342 |
| | | | 382/180 |
| 2009/0259653 | A1 | 10/2009 | Obana et al. |
| 2010/0080452 | A1 | 4/2010 | Nagano et al. |
| 2010/0202711 | A1 | 8/2010 | Kondo et al. |
| 2013/0004061 | A1 | 1/2013 | Sakurai et al. |
| 2015/0317776 | A1 | 11/2015 | Sugimoto et al. |
| 2017/0098135 | A1 | 4/2017 | Munteanu |
| 2017/0345130 | A1* | 11/2017 | Wang .................. G06T 3/4046 |

FOREIGN PATENT DOCUMENTS

| | | |
|---|---|---|
| JP | 2006-350498 | 12/2006 |
| JP | 2009-010853 | 1/2009 |
| JP | 2011-019190 | 1/2011 |
| JP | 2011-019190 A | 1/2011 |
| JP | 2013-026659 A | 2/2013 |
| JP | 5933105 | 6/2016 |
| KR | 10-0237636 | 1/2000 |
| KR | 10-2007-0019131 | 2/2007 |
| KR | 10-2017-0019131 A | 2/2007 |
| KR | 10-2017-0003476 | 1/2017 |
| WO | WO 2011-111819 A | 9/2015 |

OTHER PUBLICATIONS

U.S. Appl. No. 15/988,592, filed May 24, 2018; Lee et al.
U.S. Appl. No. 62/599,936, filed Dec. 18, 2017; Lee et al.
R. Timofte, V. De Smet, and L. Van Gool "A+: Adjusted Anchored Neighborhood Regression for Fast Super-Resolution" In Asian Conference on Computer Vision (ACCV 2014), Nov. 2014, Singapore, 15 pages.
Y. Romano, P. Millarnfar "RAISR: Rapid and Accurate Image Super Resolution" IEEE Trans. Computational Phtography, 2017, 16 pages.
Jiwon Kim, Jung Kwon Lee and Kyoung Mu Lee "Accurate Image Super-Resolution Using Very Deep Convolutional Networks" Proc. of IEEE Conference on Computer Vision and Pattern Recognition (CVPR), 2016, 9 pages.
Chao Dong, Chen Change Loy, Kaiming He, Xiaoou Tang "Image Super-Resolution Using Deep Convolutional Networks" IEEE Transactions on Pattern Analysis and Machine Intelligence (TPAMI), Preprint, 2015, 14 pages.
Office Action dated Apr. 18, 2018 in counterpart to Korean Application No. 10-2018-0027790, and English-language translation thereof.
W. T. Freeman, E. C. Pasztor, and O. T. Carmichael "Learning low-level vision" International Journal of Computer Vision, 40(1):25-47, 2000, 47 pages.
Yang, J., Wright, J., Huang, T. S., Ma Y. "Image super-resolution as sparse representation of raw image patches" CVPR (2008), 8 pages.
PCT International Search Report dated Sep. 12, 2018 for PCT/KR2018/005907.
PCT Written Opinion dated Sep. 12, 2018 for PCT/KR2018/005907.
European Search Report dated Jan. 29, 2019 for EP Application No. 18178123.8.
European Examination Report dated Feb. 8, 2019 for EP Application No. 18178123.8.
Extended EP Search Report dated Mar. 20, 2019 for EP Application No. 18209658.6.
Peng Ren et al., "Clustering-Oriented Multiple Convolutional Neural Networks for Single Image Super-Resolution", Oct. 4, 2017; XP055540476.
"Faezeh Yeganli et al., Super-Resolution Using Multiple Structured Dictionaries based on the Gradient Operator", 2016 24$^{th}$ Signal Processing and Communication Application Conference, May 1, 2016; XP055539750.
Jae-Seok Choi et al., "Super-Interpolation with Edge-Orientation-Based Mapping Kernels for Low Complex Upscaling", IEEE Transactions on Image Processing, vol. 25, No. 1, Jan. 1, 2016; XP055540729.
Romano, Yaniv, John Isidoro, and Peyman Milanfar. "RAISR: rapid and accurate image super resolution." IEEE Transactions on Computational Imaging 3.1 (2017): 110-125.
Feng, XiaoGuang, and Peyman Milanfar. "Multiscale principal components analysis for image local orientation estimation." Signals, Systems and Computers, 2002. Conference Record of the Thirty-Sixth Asilomar Conference on. vol. 1. IEEE, 2002.
Jacobs, David. "Image gradients." Computer Science Lecture, Class Notes for CMSC 426 (2005). (Year: 2005).
European Office Action dated Oct. 16, 2019 for EP Application No. 18209658.6.
Japanese Office Action dated Nov. 26, 2019 for JP Application No. 2019-517805.
CN Office Action dated Feb. 6, 2020 for CN Application No. 201910137568.0.
European Examination Report dated Jun. 12, 2020 for European Application No. 18209658.6.
Chang et al., Super Resolution Through Neighbor Embedding; 2004 IEEE Computer Society Conference on Computer Vision and Pattern Recognition; XP 32396518 A; 8 pgs.
Yang et al., Fast Image Super Resolution Based on In-Place Example Regression; 2013 IEEE Conference on Computer Vision and Pattern Resolution; XP 32492944 A; pp. 1059-1066.
European Examination Report dated Sep. 23, 2020 for EP Application No. 18178123.8.
India Examination Report dated Jan. 6, 2021 for IN Application No. 201947011944.
EP Summons to Oral Proceedings dated Feb. 9, 2021 for EP Application No. 18209658.6.
Chinese Office Action dated May 8, 2021 for CN Application No. 201910137568.0.

\* cited by examiner

FIG. 3A $$Sx = \begin{bmatrix} 1 & 2 & 0 & -2 & -1 \\ 4 & 8 & 0 & -8 & -4 \\ 6 & 12 & 0 & -12 & -6 \\ 4 & 8 & 0 & -8 & -4 \\ 1 & 2 & 0 & -2 & -1 \end{bmatrix} \quad Sy = \begin{bmatrix} -1 & -4 & -6 & -4 & -1 \\ -2 & -8 & -12 & -8 & -2 \\ 0 & 0 & 0 & 0 & 0 \\ 2 & 8 & 12 & 8 & 2 \\ 1 & 4 & 6 & 4 & 1 \end{bmatrix}$$

FIG. 3C $$SOx = \begin{bmatrix} 1 & 0 & -1 \\ 2 & 0 & -2 \\ 1 & 0 & -1 \end{bmatrix}$$

$$SOy = \begin{bmatrix} 1 & 2 & 1 \\ 0 & 0 & 0 \\ -1 & -2 & -1 \end{bmatrix}$$

FIG. 3D $$Gx = SOx \times Y = \begin{bmatrix} x11 & x12 & x13 \\ x21 & x22 & x23 \\ x31 & x32 & x33 \end{bmatrix}$$

$$Gy = SOy \times Y = \begin{bmatrix} y11 & y12 & y13 \\ y21 & y22 & y23 \\ y31 & y32 & y33 \end{bmatrix}$$

FIG. 3E $$\text{GRADIENT VECTOR} = \begin{bmatrix} x11 \\ \vdots \\ y33 \end{bmatrix} \Bigg) c$$

FIG. 4A $$\text{EIGEN VECTOR} = \begin{bmatrix} B_{1,1} & \cdots & B_{1,c} \\ \vdots & \ddots & \vdots \\ B_{c',1} & \cdots & B_{c',c} \end{bmatrix}$$

FIG. 4B $$\text{GRADIENT VECTOR}' = \begin{bmatrix} g1 \\ \vdots \\ gc' \end{bmatrix} \Bigg) c'$$

FIG. 5A $$\text{INDEX MATRIX} = \begin{bmatrix} I_{1,1} & \cdots & I_{1,c'} \\ \vdots & \ddots & \vdots \\ I_{a,1} & \cdots & I_{a,c'} \end{bmatrix}$$

FIG. 6B $$\text{INDEX MATRIX 1} = \begin{bmatrix} l'_{1,1} & \cdots & l'_{1,c'} \\ l'_{2,1} & \cdots & l'_{2,c'} \\ l'_{3,1} & \cdots & l'_{3,c'} \\ l'_{4,1} & \cdots & l'_{4,c'} \end{bmatrix}$$

FIG. 6C $$\text{INDEX MATRIX 2} = \begin{bmatrix} I''_{1,1} & \cdots & I''_{1,c'} \\ \vdots & \ddots & \vdots \\ I''_{b,1} & \cdots & I''_{b,c'} \end{bmatrix}$$

FIG. 7B $$\text{INDEX MATRIX 3} = \begin{bmatrix} I'''1,1 & \cdots & I'''1,c' \\ I'''2,1 & \cdots & I'''2,c' \\ I'''3,1 & \cdots & I'''3,c' \end{bmatrix}$$

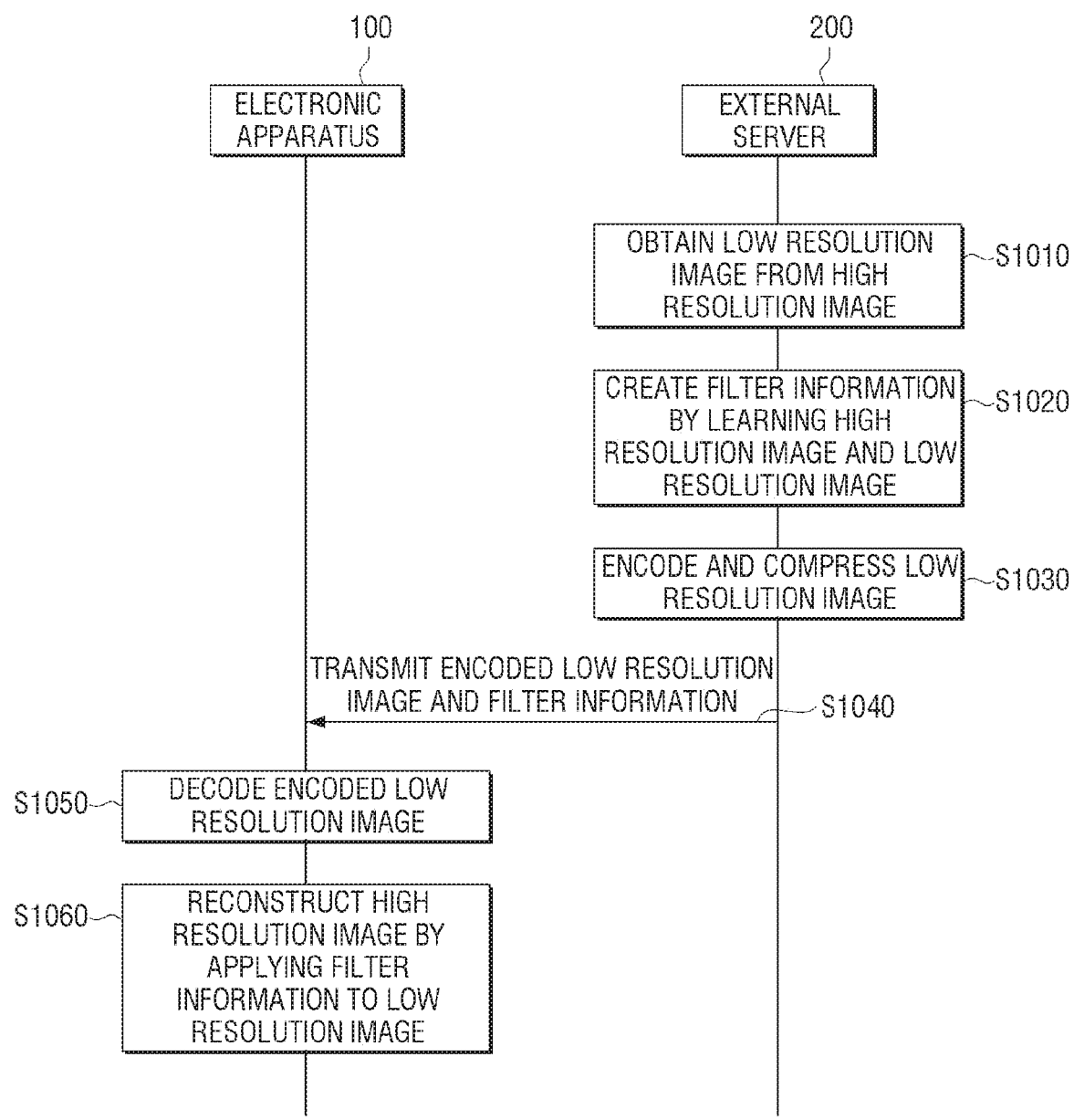

ELECTRONIC APPARATUS AND CONTROL METHOD THEREOF

CROSS-REFERENCE TO RELATED APPLICATIONS

This application is a Continuation-In-Part of U.S. application Ser. No. 15/988,592, filed May 24, 2018, which claims priority to KR 10-2018-0027790, filed Mar. 9, 2018, and Provisional Application Ser. No. 62/599,936, filed Dec. 18, 2017, the entire contents of each of which are all hereby incorporated herein by reference.

BACKGROUND

Field

The present disclosure relates generally to an electronic apparatus and a control method thereof, and for example, to an electronic apparatus performing image processing, and a control method thereof.

The present disclosure also relates to an artificial intelligence (AI) system simulating a recognition function and a decision function of a human brain using a machine learning algorithm, and an application thereof.

Description of Related Art

Recently, an artificial intelligence system implementing human-level intelligence has been used in various fields. The artificial intelligence system is a system in which a machine performs learning and decision and becomes smart by itself unlike an existing rule-based smart system. As the artificial intelligence system is used more, a recognition rate is improved and a user's taste may be more accurately understood, such that the existing rule-based smart system has been gradually replaced by a deep learning-based artificial intelligence system.

An artificial intelligence technology may include machine learning (for example, deep learning) and element technologies using the machine learning.

The machine learning may include an algorithm technology of classifying/learning features of input data by itself, and the element technology may include a technology of simulating functions such as recognition, decision, and the like, of a human brain using a machine learning algorithm such as deep learning, or the like, and may include technical fields such as linguistic understanding, visual understanding, inference/prediction, knowledge representation, a motion control, and the like.

Various fields to which the artificial intelligence technology may be applied are as follows. The linguistic understanding may refer to a technology of recognizing and applying/processing human languages, and may include natural language processing, machine translation, a dialog system, question and answer, speech recognition/synthesis, or the like. The visual understanding may refer to a technology of recognizing and processing things like human vision, and may include object recognition, object tracking, image search, human recognition, scene understanding, space understanding, image improvement, or the like. The inference/prediction may refer to a technology of deciding and logically inferring and predicting information, and may include knowledge/probability-based inference, optimization prediction, preference-based planning, recommendation, or the like. The knowledge representation may refer to a technology of automating and processing human experience information as knowledge data, and may include knowledge construction (data creation/classification), knowledge management (data utilization), or the like. The motion control may refer to a technology of controlling self-driving of a vehicle and a motion of a robot, and may include a motion control (navigation, collision, driving), a manipulation control (behavior control), or the like.

Meanwhile, a conventional image processing method may be divided into a non-leaning-based technology and a learning-based technology. The non-learning-based technology has an advantage that an image processing speed is rapid, but has a problem that flexible image processing depending on image characteristics is impossible. The learning-based technology has an advantage that flexible image processing is possible, but has a problem that real-time processing is difficult.

For example, considering a case of enlarging a resolution of an image, in an interpolation method, which is a representative method of the non-learning-based technology, a brightness of a pixel corresponding to a position at which the resolution is enlarged is calculated using a filter having low pass characteristics. In detail, there is a bi-cubic interpolation manner based on a spline, a resampling manner using a Lanczos filter formed by simplifying an ideal low-pass filter (Sinc Kernel), or the like. Such a non-learning-based technology shows stable image enlarging performance due to a low complexity, but may not reflect prior information possessed by only an image, such that edge sharpness is blurred, an edge is jagged, aliasing or ringing occurs in the vicinity of the edge.

As a representative method of the learning-based technology, there are a manner of directly using a high image quality image database for reconstruction, a manner of learning and using a high resolution conversion rule for each classified class, a manner of learning low resolution/high resolution conversion in an end-to-end mapping form by a deep learning network and enlarging the image using a learned network at the time of enlarging the image.

In the learning-based technologies, unique characteristics of an image signal are reflected in learning and are used at the time of enlarging the image, and the learning-based technologies may thus reconstruct a sharp, non-jagged, and smooth edge as compared with non-learning-based image enlarging methods. However, the learning-based technologies are appropriate for applications requiring non-real time due to a high complexity, but it is difficult to apply the learning-based technologies to apparatuses requiring real time, such as a television (TV). In addition, it is difficult to apply the learning-based technologies to system-on-chip (Soc) implementation for real time implementation.

In addition, the learning-based technologies show excellent performance with respect to edge components of which region features are clear, but show noise components with respect to a flat region of which a feature is unclear or show low performance on a detail representation surface. In addition, the learning-based technologies have a problem that the image may not be enlarged with respect to a non-learned magnification.

Therefore, it has been required to develop a technology capable of performing flexible image processing and improving an image processing speed.

SUMMARY

Example embodiments of the present disclosure address the above disadvantages and other disadvantages not described above.

The present disclosure provides an electronic apparatus performing learning-based image process in real time, and a control method thereof.

According to an example aspect of the present disclosure, an electronic apparatus includes: a storage configured to store a plurality of filters, each filter corresponding to a plurality of image patterns; and a processor configured to classify an image block including a target pixel and a plurality of surrounding pixels into one of the plurality of image patterns based on a relationship between pixels within the image block and to obtain a final image block in which the target pixel is image-processed by applying at least one filter corresponding to the classified image pattern from among the plurality of filters to the image block, wherein the plurality of filters are obtained by learning a relationship between a plurality of first sample image blocks and a plurality of second sample image blocks corresponding to the plurality of first sample image blocks through an artificial intelligence algorithm based on each of the plurality of image patterns.

The processor may calculate (determine) a gradient vector from the image block, calculate (determine) correlations of the image block to each of a plurality of index vectors based on an index matrix stored in the storage and including the plurality of index vectors and the gradient vector, and classify the image block into one of the plurality of image patterns based on the calculated (determined) correlations, and the plurality of index vectors may be obtained based on a plurality of sample gradient vectors calculated (determined) from the plurality of first sample image blocks and corresponding to the plurality of image patterns, respectively.

The processor may calculate the gradient vector from the image block when a strength of horizontal directivity of the image block is larger than that of vertical directivity of the image block, and may transpose the image block and calculate the gradient vector from the transposed image block when the strength of the horizontal directivity of the image block is less than that of the vertical directivity of the image block.

The processor may reduce a size of the gradient vector using an eigen vector stored in the storage and calculate the correlations of the image block to each of the plurality of index vectors based on the gradient vector of which the size is reduced, and the eigen vector may be created by applying a principal component analysis from the plurality of sample gradient vectors.

The processor may calculate a first correlation of the image block to each of a plurality of index vector groups based on a first index matrix stored in the storage and the gradient vector, obtain one of the plurality of index vector groups based on the first correlation, calculate a second correlation of the image block to each of a plurality of index vectors included in the obtained index vector group based on a second index matrix corresponding to the obtained index vector group from among a plurality of second index matrices stored in the storage and the gradient vector, and obtain the final image block by applying at least one of the plurality of filters to the image block based on the second correlation, the plurality of index vector groups may be obtained by dividing the plurality of index vectors into a predetermined number of groups, the first index matrix may include index vectors representing each of the plurality of index vector groups, and each of the plurality of second index matrices may include a plurality of index vectors corresponding to each of the plurality of index vector groups.

The processor may obtain one of the plurality of index vectors included in the obtained index vector group based on the second correlation, obtain at least one additional index vector included in the others of the plurality of index vector groups and corresponding to the obtained index vector based on similar index vector information stored in the storage, calculate a third correlation of the image block based on the obtained index vector, the obtained additional index vector, and the gradient vector, and obtain the final image block by applying at least one of the plurality of filters to the image block based on the third correlation.

The processor may obtain at least two of the plurality of filters based on a plurality of calculated correlations, calculate a final filter based on the at least two filters and correlations corresponding to each of the at least two filters, and obtain the final image block by applying the calculated final filter to the image block.

The plurality of first sample image blocks may be images in which resolutions of the corresponding second sample image blocks are reduced, respectively, and the processor may obtain the final image block in which a resolution of the target pixel is enlarged by applying at least one of the plurality of filters to the image block.

The processor may obtain an additional image block in which the resolution of the target pixel is enlarged by applying a non-learning-based resolution enlarging technology to the image block, and update the final image block based on the largest correlation of a plurality of calculated correlations and the additional image block.

The processor may calculate horizontal gradients and vertical gradients for the target pixel and each of the plurality of surrounding pixels, and calculate the gradient vector based on the horizontal gradients and the vertical gradients.

Each of the plurality of filters may be obtained by obtaining a plurality of first sub-sample image blocks corresponding to one of the plurality of index vectors among the plurality of first sample image blocks, obtaining a plurality of second sub-sample image blocks corresponding to the plurality of first sub-sample image blocks from among the plurality of second sample image blocks, and learning a relationship between the plurality of first sub-sample image blocks and the plurality of second sub-sample image blocks through the artificial intelligence algorithm.

According to another example aspect of the present disclosure, a method of controlling an electronic apparatus includes: classifying an image block including a target pixel and a plurality of surrounding pixels into one of a plurality of image patterns based on a relationship between pixels within the image block; and obtaining a final image block in which the target pixel is image-processed by applying at least one filter corresponding to the classified image pattern from among a plurality of filters each corresponding to the plurality of image patterns to the image block, wherein the plurality of filters are obtained by learning a relationship between a plurality of first sample image blocks and a plurality of second sample image blocks corresponding to the plurality of first sample image blocks through an artificial intelligence algorithm based on each of the plurality of image patterns.

The classifying may include: calculating (determining) a gradient vector from the image block; calculating (determining) correlations of the image block to each of a plurality of index vectors based on an index matrix including the plurality of index vectors and the gradient vector; and classifying the image block into one of the plurality of image patterns based on the calculated (determined) correlations, and the plurality of index vectors may be obtained based on a plurality of sample gradient vectors calculated from the plurality of first sample image blocks and correspond to the plurality of image patterns, respectively.

In the calculating of the gradient vector, the gradient vector may be calculated from the image block when a strength of horizontal directivity of the image block is larger than that of vertical directivity of the image block, and the image block may be transposed and the gradient vector may be calculated from the transposed image block when the strength of the horizontal directivity of the image block is less than that of the vertical directivity of the image block.

The method may further include reducing a size of the gradient vector using an eigen vector, wherein in the calculating of the correlations, the correlations of the image block to each of the plurality of index vectors are calculated based on the gradient vector of which the size is reduced, and the eigen vector is created by applying a principal component analysis from the plurality of sample gradient vectors.

The calculating of the correlations may include: calculating a first correlation of the image block to each of a plurality of index vector groups based on a first index matrix and the gradient vector; obtaining one of the plurality of index vector groups based on the first correlation; calculating a second correlation of the image block to each of a plurality of index vectors included in the obtained index vector group based on a second index matrix corresponding to the obtained index vector group among a plurality of second index matrices and the gradient vector, and in the obtaining of the final image block, the final image block is obtained by applying at least one of the plurality of filters to the image block based on the second correlation, the plurality of index vector groups may be obtained by dividing the plurality of index vectors into a predetermined number of groups, the first index matrix may include index vectors representing each of the plurality of index vector groups, and each of the plurality of second index matrices may include a plurality of index vectors corresponding to each of the plurality of index vector groups.

The calculating of the correlations may include: obtaining one of the plurality of index vectors included in the obtained index vector group based on the second correlation; obtaining at least one additional index vector included in the others of the plurality of index vector groups and corresponding to the obtained index vector based on similar index vector information; and calculating a third correlation of the image block based on the obtained index vector, the obtained additional index vector, and the gradient vector, and in the obtaining of the final image block, the final image block may be obtained by applying at least one of the plurality of filters to the image block based on the third correlation.

The obtaining of the final image block may include: obtaining at least two of the plurality of filters based on a plurality of calculated correlations; calculating a final filter based on the at least two filters and correlations corresponding to each of the at least two filters; and obtaining the final image block by applying the calculated final filter to the image block.

The plurality of first sample image blocks may be images in which resolutions of the corresponding second sample image blocks are reduced, respectively, and in the obtaining of the final image block, the final image block in which a resolution of the target pixel is enlarged may be obtained by applying at least one of the plurality of filters to the image block.

The method may further include: obtaining an additional image block in which the resolution of the target pixel is enlarged by applying a non-learning-based resolution enlarging technology to the image block; and updating the final image block based on the largest correlation of a plurality of calculated correlations and the additional image block.

In the calculating of the gradient vector, horizontal gradients and vertical gradients for the target pixel and each of the plurality of surrounding pixels may be calculated, and the gradient vector may be calculated based on the horizontal gradients and the vertical gradients.

Each of the plurality of filters may be obtained by obtaining a plurality of first sub-sample image blocks corresponding to one of the plurality of index vectors from among the plurality of first sample image blocks, obtaining a plurality of second sub-sample image blocks corresponding to the plurality of first sub-sample image blocks from among the plurality of second sample image blocks, and learning a relationship between the plurality of first sub-sample image blocks and the plurality of second sub-sample image blocks through the artificial intelligence algorithm.

According to various example embodiments of the present disclosure as described above, the electronic apparatus may perform image processing in real time and be thus used in various applications, and may improve quality of the image processing as compared with non-learning-based image processing by performing learning-based image processing.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIGS. 3A, 3B, 3C, 3D and 3E are diagrams illustrating an example method of deciding directivity of an image block and creating a gradient vector according to an example embodiment of the present disclosure;

FIGS. 4A and 4B are diagrams illustrating an example feature dimension reduction of a gradient vector according to an example embodiment of the present disclosure;

FIGS. 5A and 5B are diagrams illustrating an example search of a filter using an index matrix according to an example embodiment of the present disclosure;

FIGS. 6A, 6B and 6C are diagrams illustrating an example method of reducing a search calculation amount of a filter according to an example embodiment of the present disclosure;

FIGS. 7A and 7B are diagrams illustrating an example method of reducing a search calculation amount of a filter according to another example embodiment of the present disclosure;

FIG. 10 is a flow diagram illustrating an example streaming operation according to an example embodiment of the present disclosure;

DETAILED DESCRIPTION

Figure 1A:
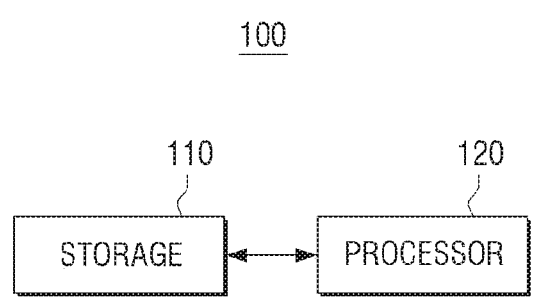
FIG. 1A is a block diagram illustrating components of an example electronic apparatus according to an example embodiment of the present disclosure.

The various example embodiments of the present disclosure may be diversely modified. Accordingly, specific example embodiments are illustrated in the drawings and are described in detail in the disclosure. However, it is to be understood that the present disclosure is not limited to a specific example embodiment, but includes all modifications, equivalents, and substitutions without departing from the scope and spirit of the present disclosure. Also, well-known functions or constructions may not be described in detail where they obscure the disclosure with unnecessary detail.

Hereinafter, various example embodiments of the present disclosure will be described in greater detail with reference to the accompanying drawings.

FIG. 1A is a block diagram illustrating example components of an electronic apparatus 100 according to an example embodiment of the present disclosure. As illustrated in FIG. 1A, the electronic apparatus 100 includes a storage 110 and a processor (e.g., including processing circuitry) 120.

The electronic apparatus 100 may be an apparatus performing image processing. For example, the electronic apparatus 100 may be an apparatus performing image processing based on data learned through an artificial intelligence algorithm. For example, the electronic apparatus 100 may, for example, and without limitation, be a desktop personal computer (PC), a laptop computer, a smartphone, a tablet PC, a server, a refrigerator, a washing machine, a signage, or the like. In addition, the electronic apparatus 100 may, for example, and without limitation, be a system itself in which a cloud computing environment is configured. However, the electronic apparatus 100 is not limited thereto, but may be any apparatus that may perform image processing.

The storage 110 may store a plurality of filters corresponding to each of a plurality of image patterns. Here, the plurality of image patterns may be classified depending on image characteristics. For example, a first image pattern may be an image pattern having many lines in a horizontal direction, and a second image pattern may be an image pattern having many lines in a rotation direction.

The storage 110 may further store an index matrix including a plurality of index vectors. The plurality of index vectors may be obtained based on a plurality of sample gradient vectors calculated (determined) from a plurality of first sample image blocks, and may correspond to the plurality of image patterns, respectively. The plurality of filters may be obtained by learning a relationship between the plurality of first sample image blocks and a plurality of second sample image blocks corresponding to the plurality of first sample image blocks through an artificial intelligence algorithm based on each of the plurality of index vectors.

The plurality of index vectors and the plurality of filters may be created by an external server rather than the electronic apparatus 100. However, the plurality of index vectors and the plurality of filters are not limited thereto, but may also be created by the electronic apparatus 100. In this case, the storage 110 may store the plurality of first sample image blocks and the plurality of second sample image blocks.

A method of creating the gradient vectors, the plurality of index vectors, and the plurality of filters is described below.

The storage 110 may store at least one image block. The storage 110 may store the plurality of first sample image blocks and the plurality of second sample image blocks. In addition, the storage 110 may store a non-learning-based filter, and a kind of storage is not limited.

The storage 110 may, for example, and without limitation, be implemented by a hard disk, a non-volatile memory, a volatile memory, or the like, and may be any component that may store data.

The processor 120 may include various processing circuitry and generally controls an operation of the electronic apparatus 100.

According to an example embodiment, the processor 120 may be implemented, for example, and without limitation, by a digital signal processor (DSP), a microprocessor, and/or a time controller (TCON), or the like. However, the processor 120 is not limited thereto, but may include, for example, and without limitation, one or more of a dedicated processor, a central processing unit (CPU), a micro controller unit (MCU), a micro processing unit (MPU), a controller, an application processor (AP), a communication processor (CP), an ARM processor, and/or may be defined by these terms, or the like. In addition, the processor 120 may be implemented by a system-on-chip (SoC) or a large scale integration (LSI) in which a processing algorithm is embedded, and/or may be implemented in a field programmable gate array (FPGA) form.

The processor 120 may receive an image block including a target pixel and a plurality of surrounding pixels input from an external server. In this case, the processor 120 may store the image block in the storage 110. The processor 120 may read the image block stored in the storage 110. The processor 120 may read an image block having a predetermined size from an image frame stored in the storage 110. For example, the processor 120 may read a first image block of 3×3 of the left upper end of the image frame, and may image-process the first image block. In addition, the processor 120 may read a second image block of 3×3 moved rightward from the left upper end of the image frame by a unit pixel, and may image-process the second image block. In this manner, the processor 120 may perform image processing on the entire image frame.

The target pixel may be a pixel that becomes a target of filtering to be described below. That is, the target pixel may be filtered based on pixel values of the plurality of surrounding pixels.

The processor 120 may classify the image block including the target pixel and the plurality of surrounding pixels into one of the plurality of image patterns based on a relationship between pixels within the image block. For example, when a difference between pixel values of pixels adjacent to each other in the horizontal direction is smaller than that of pixel values of pixels adjacent to each other in a vertical direction, the processor 120 may classify the image block into an image pattern having characteristics of the vertical direction.

However, the present disclosure is not limited thereto, and the processor 120 may also obtain a relationship between pixels within the image block depending on various methods.

In addition, the processor 120 may obtain a final image block in which the target pixel is image-processed by applying at least one filter corresponding to the classified image pattern from among the plurality of filters to the image block.

As another example for classifying the image block, the processor 120 may calculate (determine) a gradient vector from the image block. For example, the processor 120 may calculate horizontal gradients and vertical gradients for the target pixel and each of the plurality of surrounding pixels, and calculate the gradient vector based on the horizontal gradients and the vertical gradients. The gradient vector may indicate change amounts for pixels existing in a predetermined direction in relation to each pixel. That is, characteristics of the image block may be detected through the gradient vector.

For example, the processor 120 may calculate a horizontal gradient and a vertical gradient for an image block of 3×3 using a Sobel operator. Each of the horizontal gradient and the vertical gradient may include nine elements, and the processor 120 may arrange the elements of each of the horizontal gradient and the vertical gradient in a predetermined sequence and convert the elements into a vector form. The predetermined sequence may be set by various methods. However, the predetermined sequence may be the same as a sequence for calculating the gradient vector in a process of creating a plurality of index vectors and a plurality of filters to be described below.

The processor 120 may calculate the gradient vector of the image block through various methods in addition to the Sobel operator, and the various methods are not particularly limited. In addition to the horizontal and vertical gradient vectors, a gradient vector having another angle may be calculated, and any method may be used so long as the gradient vector is calculated by the same method as a method used in a process of creating a plurality of index vectors and a plurality of filters to be described below. Hereinafter, a case in which a gradient vector of c×1 is calculated is described for convenience of explanation. Here, c may be changed depending on a size of an image block.

The processor 120 may calculate correlations of the image block to each of the plurality of index vectors based on the index matrix stored in the storage 110 and the gradient vector. The index matrix may include the plurality of index vectors, and the plurality of index vectors may be obtained based on the plurality of sample gradient vectors calculated from the plurality of first sample image blocks.

For example, in the case in which 1,000,000 sample gradient vectors calculated from 1,000,000 first sample image blocks are divided into groups for each of characteristics of the image block, each of the plurality of index vectors may be a vector representing each group. That is, the correlations of the image block to each of the plurality of index vectors may mean similarities of the image block to each of the a groups. In addition, the image block may be considered as having characteristics similar to those of a group corresponding to the largest correlation of a correlations.

However, this is only an example, and the number of first sample image blocks and the number of groups may be changed. In addition, the number of groups may also be changed depending on a kind of filter. For example, in the case of a resolution enlarging filter, the number of groups is a, but in the case of a sharpen filter, the number of groups may not be a.

The processor 120 may obtain a final image block in which the target pixel is image-processed by applying at least one filter of the plurality of filters to the image block based on the calculated correlations. Here, the filter may be the resolution enlarging filter, the sharpen filter, or the like, but is not limited thereto, and may also be any filter related to image processing.

In addition, the plurality of filters may be obtained by learning a relationship between the plurality of first sample image blocks and the plurality of second sample image blocks corresponding to the plurality of first sample image blocks through the artificial intelligence algorithm based on each of the plurality of index vectors.

For example, each of the plurality of filters may be obtained by obtaining a plurality of first sub-sample image blocks corresponding to one of the plurality of index vectors from among the plurality of first sample image blocks, obtaining a plurality of second sub-sample image blocks corresponding to the plurality of first sub-sample image blocks from among the plurality of second sample image blocks, and learning a relationship between the plurality of first sub-sample image blocks and the plurality of second sub-sample image blocks through the artificial intelligence algorithm.

In the example described above, each of the plurality of filters may, for example, and without limitation, be a resolution enlarging filter obtained by learning image characteristics of one of the a groups through the artificial intelligence algorithm. In the case in which first image characteristics are represented by a first index vector and a first filter corresponding to the first index vector exists and second image characteristics are represented by a second index vector and a second filter corresponding to the second index vector exists, when a correlation between the image block and the first image characteristics is high, the image block may show more improved quality in the case in which a resolution thereof is enlarged through the first filter than in the case in which the resolution thereof is enlarged through the second filter. The reason is that the first filter and the second filter are filters learned to be appropriate for the first image characteristics and the second image characteristics, respectively.

The processor 120 may calculate the gradient vector from the image block when a strength of horizontal directivity of the image block is larger than that of vertical directivity of the image block, and may transpose the image block and calculate the gradient vector from the transposed image block when the strength of the horizontal directivity of the image block is smaller than that of the vertical directivity of the image block.

For example, the processor 120 may transpose the image block of which the vertical directivity is dominant to the image block of which the horizontal directivity is dominant, and calculate the gradient vector from the image block of which the horizontal directivity is dominant. In this case, the number of index vectors may be reduced, and a calculation speed may thus be improved.

For example, in the case in which the image block having the horizontal directivity is divided into a first groups for each of image characteristics, the image block having the vertical directivity may also be divided into a second groups for each of image characteristics. Therefore, a total of 2× a groups may be formed for each of the image characteristics, and a total of 2× a index vectors may be created.

Therefore, in the case in which the processor 120 transposes the image block of which the vertical directivity is dominant, the transposed image block may have the horizontal directivity, and may be included in one of the first groups. That is, the processor 120 may process an image block belonging to one of the second groups in one of the first groups by transposing the image block of which the vertical directivity is dominant, and may process the image block of which the horizontal directivity is dominant in one of the first groups without transposing the image block of which the horizontal directivity is dominant. Therefore, the number of index vectors may be reduced by half depending on a transpose operation, and a calculation speed may be improved.

However, the present disclosure is not limited thereto, and the processor 120 may obtain the gradient vector without transposing the image block. For example, the processor 120 may obtain the gradient vector without transposing the image block even though one of the vertical directivity and the horizontal directivity of the image block is dominant. That is, the processor 120 may divide the image block having the horizontal directivity into a first groups for each of image characteristics and divide the image block having the vertical directivity into a second groups for each of image characteristics.

In this case, a calculation speed may be decreased and the number of index vectors may be increased, as compared with a case of transposing the image block and then obtaining the gradient vector. However, in the case in which the number of index vectors is a threshold number or less, a calculation speed improvement effect depending on the transpose is insignificant, but a calculation time required for performing the transpose on the image block may be reduced. Therefore, the processor 120 may determine whether or not to perform the transpose based on the number of index vectors.

Hereinafter, it will be described that the transpose is performed on the image block based on the horizontal directivity or the vertical directivity of the image block for convenience of explanation.

The processor 120 may obtain a final image block in which the target pixel is image-processed by applying the filter to the transposed image block and again transposing the image block. In the case of an image block that is not transposed, an operation of applying the filter to the image block and then transposing again the image block may be omitted.

Meanwhile, although a case in which the processor 120 transposes the image block of which the vertical directivity is dominant is described hereinabove, this is only an example, and the processor 120 may also transpose the image block of which the horizontal directivity is dominant.

Meanwhile, the processor 120 may reduce a size of the gradient vector using an eigen vector stored in the storage 110, and calculate the correlations of the image block to each of the plurality of index vectors based on the gradient vector of which the size is reduced. Here, the eigen vector may be created by applying a principal component analysis from the plurality of sample gradient vectors.

When the eigen vector is not used in a state in which a index vectors exist, an index matrix may have a form of $a \times c$. In this regard, when a gradient vector of $c \times 1$ is reduced to a gradient vector of $c' \times 1$ using the eigen vector, an index matrix may have a form of $a \times c'$. In detail, feature dimensions of a plurality of index vectors included in the index matrix of $a \times c$ may be reduced using the same eigen vector, and the index matrix including the plurality of index vectors of which the feature dimensions are reduced may have the form of $a \times c'$. Here, the eigen vector may have a form of $c' \times c$, and $c'$ may be smaller than $c$.

A calculation speed may be improved in the case of using the index matrix of $a \times c'$ as compared with the case of using the index matrix of $a \times c$.

Meanwhile, the principal component analysis is a statistical method of extracting principal components concisely expressing variance type patterns of many variables as a linear combination of original variables. That is, in the case in which p variables exist, information obtained from the p variables may be reduced to k variables significantly smaller than p. In the above example, c feature dimensions may be considered as being reduced to c' feature dimensions. However, the number of reduced feature dimensions is not limited, but may also be changed.

Hereinafter, a case of reducing the index matrix and the gradient vectors using the eigen vector is described. However, the present disclosure is not limited thereto, and a configuration that does not use the eigen vector corresponds to an example embodiment of the present disclosure.

Meanwhile, the processor 120 may calculate a first correlation of the image block to each of a plurality of index vector groups based on a first index matrix stored in the storage 110 and the gradient vector, obtain one of the plurality of index vector groups based on the first correlation, and obtain a second index matrix corresponding to the obtained index vector group from among a plurality of second index matrices stored in the storage 110.

Here, the plurality of index vector groups may be obtained by dividing the plurality of index vectors into a predetermined number of groups. For example, the plurality of index vector groups may be divided into a total of four groups depending on characteristics, and each of the four groups may include b index vectors. That is, the b index vectors in the same group may be similar to one another.

The first index matrix may include index vectors representing each of the plurality of index vector groups. In the example described above, in each of the four groups, one of the b index vectors may be set to a representative, and the first index matrix may be formed using four index vectors representing the respective groups. Here, the first index matrix may have a form $4 \times c'$.

Each of the plurality of second index matrices may include a plurality of index vectors corresponding to each of the plurality of index vector groups. For example, each of the plurality of index vectors may have a form of $b \times c'$.

In the example described above, the processor 120 may determine to which of the plurality of index vector groups the image block belongs based on the first correlation, and obtain a second index matrix corresponding to the corresponding group from among the plurality of second index matrices.

The processor 120 may calculate a second correlation of the image block to each of the plurality of index vectors included in the obtained index vector group based on the obtained second index matrix and the gradient vector, and may obtain the final image block by applying at least one of the plurality of filters to the image block based on the second correlation. A calculation speed may be improved through the method as described above.

However, this is only an example, and the number of index vector groups may be changed. In addition, the numbers of index vectors included in the plurality of index vector groups may be different from each other.

Meanwhile, according to the example embodiment described above, the correlations to only some of the total of a index vectors may be calculated. Therefore, calculation of the correlations to the other index vectors is omitted, and in the case in which grouping is inappropriate, an index vector having the highest correlation may not be detected. Hereinafter, a method of complementing this is described.

The processor 120 may obtain one of the plurality of index vectors included in the obtained index vector group based the second correlation, obtain at least one additional index vector included in the others of the plurality of index vector groups and corresponding to the obtained index vector based on similar index vector information stored in the storage 110, calculate a third correlation of the image block based on the obtained index vector, the obtained additional index vector, and the gradient vector, and obtain the final image block by applying at least one of the plurality of filters to the image block based on the third correlation.

That is, the storage 110 may further store the similar index vector information, which is information on additional index vectors included in different index vector groups for each index vector and having similar characteristics.

When one index vector is obtained based on the second correlation, the processor 120 may calculate a correlation of the image block to the additional index vectors having characteristics similar to those of the obtained index vector based on information stored in the storage 110. The processor 120 may obtain at least one filter based on the correlation to the image block to the obtained index vector and the correlation to the image block to the additional index vectors.

In this case, additional multiplication is performed in a process of calculating the correlation of the image block to the additional index vectors, such that a speed may be decreased as compared with the previous example embodiment, but accuracy may be improved as compared with the previous example embodiment. In addition, in the case in which the number of additional index vectors is not many, a decrease in the speed may be insignificant.

The processor 120 may obtain at least two of the plurality of filters based on a plurality of calculated correlations, calculate a final filter based on the at least two filters and correlations corresponding to each of the at least two filters, and obtain the final image block by applying the calculated final filter to the image block.

For example, the processor 120 may obtain the first filter and the second filter, and calculate the final filter by weighting and summing the first filter and the second filter based on the first correlation and the second correlation corresponding to each of the first filter and the second filter.

However, the present disclosure is not limited thereto, and the processor 120 may also calculate the final filter from the first filter and the second filter without considering the correlations.

Meanwhile, the plurality of first sample image blocks may be images in which resolutions of the corresponding second sample image blocks are reduced, respectively, and the processor 120 may obtain the final image block in which a resolution of the target pixel is enlarged by applying at least one of the plurality of filters to the image block.

In this case, the plurality of filters may be filters learned and obtained through the artificial intelligence algorithm to derive the corresponding second sample image blocks in which the resolutions are enlarged from each of the plurality of first sample image blocks.

The processor 120 may obtain an additional image block in which the resolution of the target pixel is enlarged by applying a non-learning-based resolution enlarging technology to the image block, and update the final image block based on the largest correlation of the plurality of calculated correlations and the additional image block.

For example, the processor 120 may select the largest correlation of the plurality of calculated correlations, and determine a change level of the final image block based on the selected correlation. In detail, the processor 120 may minimize and/or reduce a change of the final image block by reducing an influence of the additional image block as the selected correlation becomes large, and enlarge the change of the final image block by enlarging the influence of the additional image block as the selected correlation becomes small.

Figure 1B:
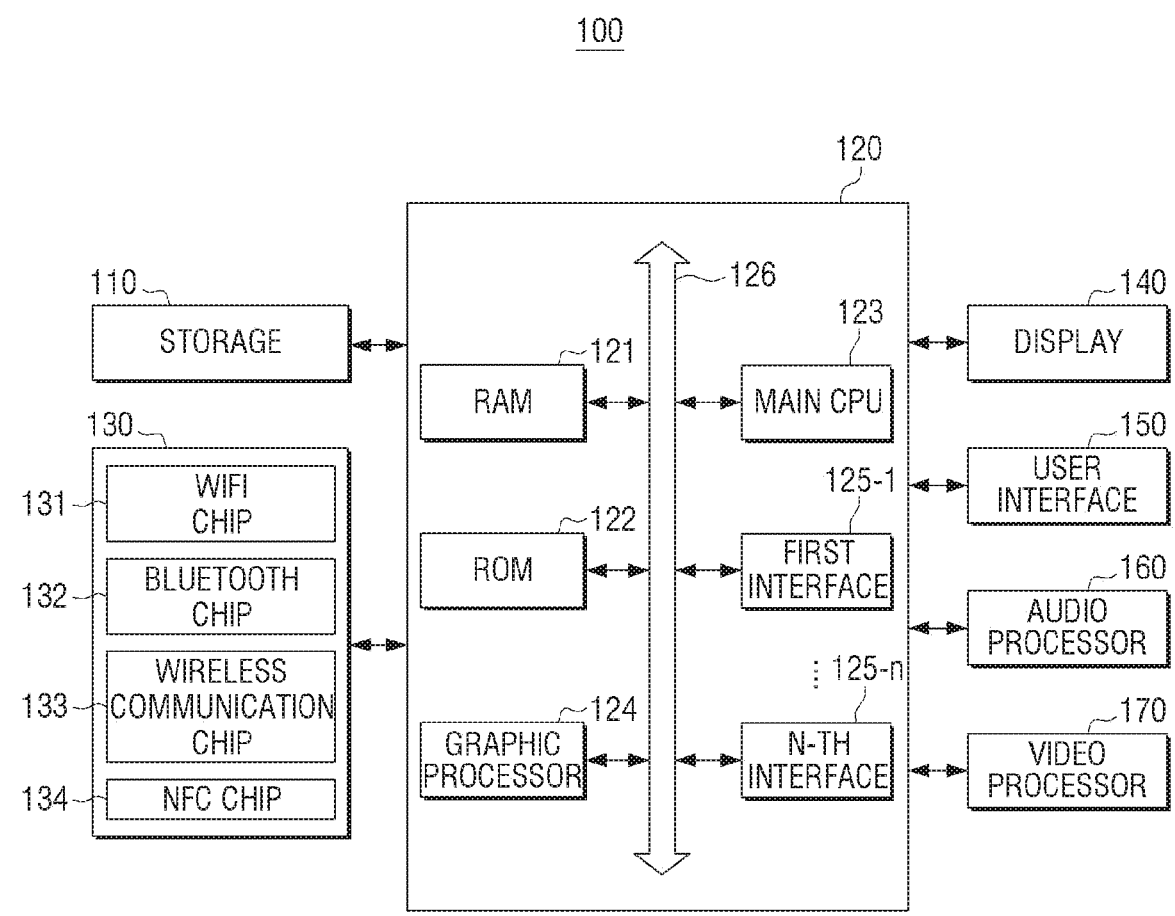
FIG. 1B is a block diagram illustrating an example of components of the electronic apparatus.

FIG. 1B is a block diagram illustrating example components of the electronic apparatus 100. As illustrated in FIG. 1B, the electronic apparatus 100 includes the storage 110, the processor (e.g., including processing circuitry) 120, a communicator (e.g., including communication circuitry) 130, a display 140, a user interface 150, an audio processor (e.g., including audio processing circuitry) 160, and a video processor (e.g., including video processing circuitry) 170. A detailed description for components overlapping those illustrated in FIG. 1A among components illustrated in FIG. 1B may not be repeated here.

The processor 120 may include various processing circuitry and generally controls an operation of the electronic apparatus 100 using various programs stored in the storage 110.

For example, the processor 120 may include, without limitation, a random access memory (RAM) 121, a read only memory (ROM) 122, a main central processing unit (CPU) 123, a graphic processor 124, first to n-th interfaces 125-1 to 125-n, and a bus 126.

The RAM 121, the ROM 122, the main CPU 123, the graphic processor 124, the first to n-th interfaces 125-1 to 125-n, and the like, may be connected to one another through the bus 126.

The first to n-th interfaces 125-1 to 125-n are connected to the various components described above. One of the interfaces may be a network interface connected to an external server through a network.

The main CPU 123 accesses the storage 110 to perform booting using an operating system (O/S) stored in the storage 110. In addition, the main CPU 123 performs various operations using various programs, or the like, stored in the storage 110.

An instruction set for booting a system, or the like, may be stored in the ROM 122. When a turn-on command is input to supply power to the main CPU 123, the main CPU 123 copies the operating system (O/S) stored in the storage 110 to the RAM 121 depending on an instruction stored in the ROM 122, and execute the O/S to boot the system. When the booting is completed, the main CPU 123 copies various application programs stored in the storage 110 to the RAM 121, and executes the application programs copied to the RAM 121 to perform various operations.

The graphic processor 124 renders a screen including various objects such as an icon, an image, a text, and the like, using a calculator (not illustrated) and a renderer (not illustrated). The calculator (not illustrated) calculates attribute values such as coordinate values at which the respective objects will be displayed, forms, sizes, colors, and the like, of the respective objects depending on a layout of the screen based on a received control command. The renderer (not illustrated) renders screens of various layouts including objects based on the attribute values calculated in the calculator (not illustrated). The screen rendered by the renderer (not illustrated) is displayed on a display region of the display 140.

Meanwhile, the operation of the processor 120 described above may be performed by a program stored in the storage 110.

The storage 110 stores various data such as an operating system (O/S) software module for driving the electronic apparatus 100, an image block analyzing module, a filter module, and the like.

The communicator 130 may include various communication circuitry and is a component performing communication with various types of external servers in various types of communication manners. The communicator 130 may include various communication circuitry included in various communication chips, such as, for example, and without limitation, a wireless fidelity (WiFi) chip 131, a Bluetooth chip 132, a wireless communication chip 133, a near field communication (NFC) chip 134, or the like. The processor 120 performs communication with various external servers using the communicator 130.

The WiFi chip 131 and the Bluetooth chip 132 perform communication in a WiFi manner and a Bluetooth manner, respectively. In the case of using the WiFi chip 131 or the Bluetooth chip 132, various kinds of connection information such as a service set identifier (SSID), a session key, and the like, are first transmitted and received, communication is connected using the connection information, and various kinds of information may then be transmitted and received. The wireless communication chip 133 means a chip performing communication depending on various communication protocols such as Institute of Electrical and Electronics Engineers (IEEE), Zigbee, 3rd generation (3G), 3rd generation partnership project (3GPP), long term evolution (LTE), and the like. The NFC chip 134 means a chip operated in the NFC manner using a band of 13.56 MHz among various radio frequency identification (RFID) frequency bands such as 135 kHz, 13.56 MHz, 433 MHz, 860 to 960 MHz, 2.45 GHz, and the like.

The processor 120 may receive the index matrix, the plurality of filters, and the like, from the external server through the communicator 130. Alternatively, the processor 120 may receive the image blocks, and the like, in real time from the external server through the communicator 130.

The display 140 may be implemented by various types of displays such as, for example, and without limitation, a liquid crystal display (LCD), an organic light emitting diode (OLED) display, a plasma display panel (PDP), or the like. A driving circuit, a backlight unit, and the like, that may be implemented in a form such as a-si, low temperature poly silicon (LTPS), a thin film transistor (TFT), an organic TFT (OTFT), or the like, may be included in the display 140. Meanwhile, the display 140 may be implemented by a touch screen by combining with a touch sensor.

The processor 120 may control the display 140 to display the image block and the final image block.

The user interface 150 receives various user interactions. Here, the user interface 150 may be implemented in various forms depending in an implementation of the electronic apparatus 100. For example, the user interface 150 may include various interface circuitry, such as, for example, and without limitation, a button included in the electronic apparatus 100, a microphone receiving a user's voice, a camera sensing a user's motion, or the like. In the case in which the electronic apparatus 100 is implemented by a touch-based electronic apparatus, the user interface 150 may also be implemented in a form of a touch screen forming a layer structure together with a touch pad. In this case, the user interface 150 may be used as the display 140 described above.

The audio processor 160 is a component performing processing for audio data. In the audio processor 160 may include various audio processing circuitry and may perform various kinds of processing such as, for example, and without limitation, decoding, amplifying, noise filtering, or the like, for the audio data may be performed.

The video processor 170 is a component performing processing for video data. In the video processor 170 may include various video processing circuitry and may perform various kinds of image processing such as, for example, and without limitation, decoding, scaling, noise filtering, frame rate converting, resolution converting, or the like, for the video data may be performed.

Meanwhile, a model including the index matrix, the plurality of filters, and the like, provided by the external server as described above is a decision model learned based on the artificial intelligence algorithm, and may be, for example, a model based on a neutral network. The learned decision model may be designed to simulate a human brain structure on a computer, and may include a plurality of network nodes simulating neurons of a human neutral network and having weights. The plurality of network nodes may form a connection relationship thereamong to simulate synaptic activity of the neurons transmitting and receiving signals through synapses. In addition, the learned decision model may include, for example, a neutral network model or a deep learning model developed from the neutral network model. In the deep learning model, the plural of network nodes may be positioned at different depths (or layers), and may transmit and receive data thereamong depending on a convolution connection relationship. An example of the learned decision model may include, for example, and without limitation, a deep neural network (DNN), a recurrent neural network (RNN), a bidirectional recurrent deep neural network (BRDNN), or the like, but is not limited thereto.

In addition, the electronic apparatus 100 may use a personal secretary program, which is an artificial intelligence dedicated program (or an artificial intelligence agent) to receive the final image block obtained by applying the filter to the image block as described above. In this case, the personal secretary program, which is a dedicated program for providing an artificial intelligence (AI) based service, may be executed by an existing general-purpose processor (for example, a central processing unit (CPU)) or a separate AI dedicated processor (for example, a graphic processing unit (GPU)).

In the case in which a predetermined user input (for example, image photographing depending on a manipulation of a photographing button, or the like) is input or the image block is input from an external apparatus, the artificial intelligence agent may be operated (or executed).

According to another example embodiment of the present disclosure, the electronic apparatus 100 may transmit the input image block to the external server. The external server may obtain the final image block by directly applying the filter to the image block, and transmit the obtained final image block to the electronic apparatus 100.

The processor 120 may improve quality of image processing by performing learning-based image processing in real time through the method as described above.

Hereinafter, example operations of the processor 120 are described in greater detail with reference to the drawings.

Figure 2:
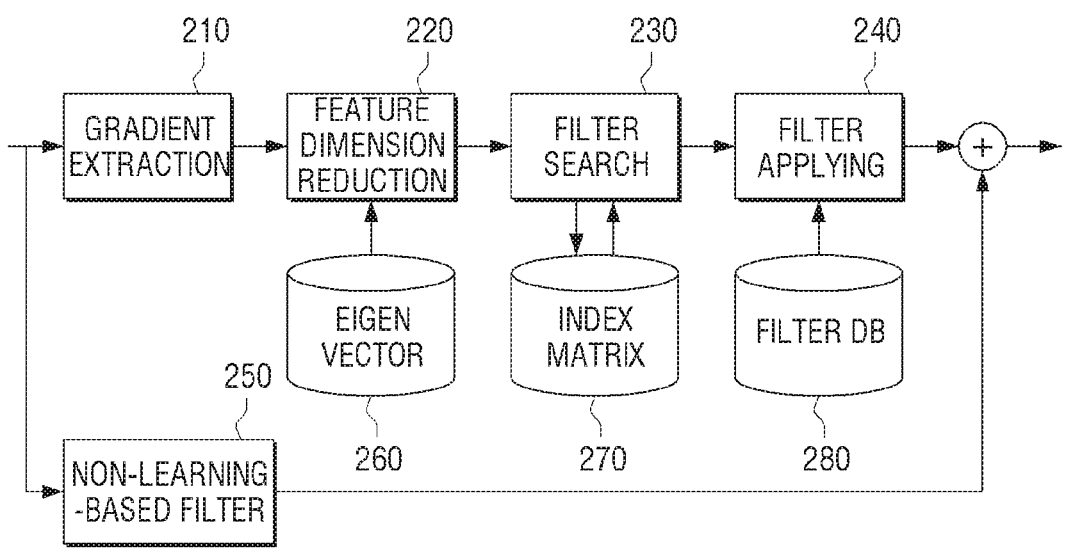
FIG. 2 is a diagram illustrating example operations of a processor according to an example embodiment of the present disclosure.

FIG. 2 is a diagram illustrating example operations of a processor 120 according to an example embodiment of the present disclosure.

When an image block is input, the processor 120 may first perform gradient extraction 210 of the image block. For example, the processor 120 may decide directivity of the image block and create a gradient vector. In addition, the processor 120 may also transpose the image block based on a directivity decision result of the image block.

The processor 120 may perform feature dimension reduction 220 of the gradient vector using an eigen vector 260.

The processor 120 may perform filter search 230 on a filter to be applied to the gradient vector of which a feature dimension is reduced, using an index matrix 270.

The processor 120 may obtain at least one of a plurality of filters included in a filter database DB 280 based on a search result, and apply at least one filter to the image block (filter application 240).

The plurality of filters included in the filter database 280 may be learning-based filters. For example, the plurality of filters may be obtained by learning a relationship between a plurality of first sample image blocks and a plurality of second sample image blocks corresponding to the plurality of first sample image blocks through an artificial intelligence algorithm. That is, the operation described above may be considered as applying the learning-based filter to the image block.

Meanwhile, the processor 120 may apply a non-learning-based filter to the image block (applying 250 of non-learning-based filter), separately from the operation described above. For example, the processor 120 may perform the applying of the learning-based filter and the applying of the non-learning-based filter to the same image block in parallel.

In addition, the processor 120 may weight and sum a first result depending on the applying of the learning-based filter and a second result depending on the applying of the non-learning-based filter.

Meanwhile, the eigen vector 260, the index matrix 270, and the filter database 280 may be created using the plurality of first sample image blocks and the plurality of second sample image blocks corresponding to the plurality of first sample image blocks.

In FIG. 2, the transposition of the image block depending on a directivity decision result, the feature dimension reduction of the gradient vector, and the applying of the non-learning-based filter are optional operations, and may be omitted.

FIGS. 3A, 3B, 3C, 3D and 3E are diagrams illustrating an example method of deciding directivity of an image block and creating a gradient vector according to an example embodiment of the present disclosure.

As illustrated in FIG. 3, the processor 120 may decide directivity of the image block using masks such as Sx and Sy. For example, the processor 120 may decide the directivity of the image block by applying an image block of 5×5 and the masks to the following Equation 1:

$$G_V = \Sigma\Sigma s_x(n,m)Y(i+n,j+m)$$

$$G_H = \Sigma\Sigma s_y(n,m)Y(i+n,j+m). \quad \text{[Equation 1]}$$

Here, Gv indicates vertical directivity of the image block, $G_H$ indicates horizontal directivity of the image block, n and m indicate indices for identifying a row and a column, respectively, and i and j indicate reference points of the image block in an image frame.

The processor 120 may obtain the directivity of the image block by comparing a magnitude of the vertical directivity and a magnitude of the horizontal directivity with each other.

The processor 120 may determine whether or not to transpose the image block based on directivity used in the case of creating an eigen vector, an index matrix, and a plurality of filters. For example, in the case in which only the horizontal directivity is used and the vertical directivity is not used at the time of creating the eigen vector, the index matrix, and the plurality of filters, the processor 120 does not transpose the image block when the image block has the horizontal directivity, and may transpose the image block when the image block has the vertical directivity. In the case in which only the vertical directivity is used and the horizontal directivity is not used at the time of creating the eigen vector, the index matrix, and the plurality of filters, the processor 120 does not transpose the image block when the image block has the vertical directivity, and may transpose the image block when the image block has the horizontal directivity.

Figure 3B:
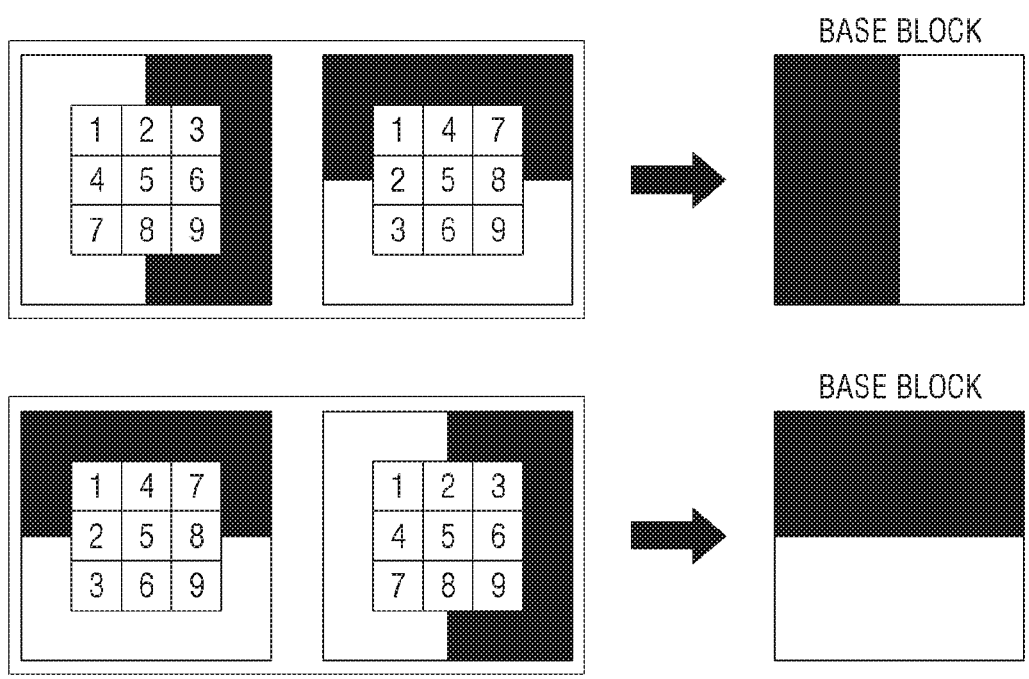

In FIG. 3B, a base block indicates directivity used in the case of creating the eigen vector, the index matrix, and the plurality of filters.

In the case in which the base block has the vertical directivity as in an upper end of FIG. 3B, the processor 120 may transpose only a right image block of left two image blocks. In the case in which the base block has the horizontal directivity as in a lower end of FIG. 3B, the processor 120 may transpose only a right image block of left two image blocks.

Since only one of the vertical directivity and the horizontal directivity is used, amounts of data of the eigen vector, the index matrix, and the plurality of filters may be reduced. In addition, additional calculation depending on the directivity decision and the transposition of the image block may be generated, but a calculation amount may be reduced in the subsequent operations due to the reduction in the amounts of data of the eigen vector, the index matrix, and the plurality of filters. For example, the entire calculation amount may be reduced depending on a directivity decision operation.

Meanwhile, the masks such as Sx and Sy illustrated in FIG. 3A are only an example, and the processor 120 may decide the directivity of the image block by another method. In addition, although only pixels of 3×3 in the image block of 5×5 are illustrated in FIG. 3B, this is to illustrate the directivity. The processor 120 may decide the directivity of the image block by applying the image block of 5×5 and the masks as illustrated in FIG. 3A.

However, the present disclosure is not limited thereto, and the processor 120 may also decide the directivity of the image block using only some pixels of the image block to improve a calculation speed. For example, the processor 120 may decide the directivity of the image block by applying a mask for deciding directivity of 3×3 to pixels of 3×3 except for pixels positioned in the vicinity of edges in the image block of 5×5.

Hereinafter, a case in which an image block of 3×3 is input is described for convenience of explanation. However, the present disclosure is not limited thereto, and the processor 120 may be operated in the same manner with respect to image blocks having other sizes. In addition, the storage 110 may store masks corresponding to various image sizes, a gradient calculating operator to be described below, an index matrix, a plurality of vectors, and the like.

The processor 120 may calculate a horizontal gradient and a vertical gradient for an image block of 3×3 using a Sobel operator, as illustrated in FIG. 3C. The processor 120 may obtain a horizontal gradient of 3×3 and a vertical gradient of 3×3 by the Sobel operator and multiplication of an image block of 3×3, as illustrated in FIG. 3D.

The processor 120 may calculate a gradient vector of c×1 from the horizontal gradient of 3×3 and the vertical gradient of 3×3, as illustrated in FIG. 3E.

Although a case in which the gradient vector is calculated after the transposition of the image block is performed is described hereinabove, the present disclosure is not limited thereto. For example, the processor 120 may decide only the directivity of the image block, and calculate the horizontal gradient and the vertical gradient of the image block. In addition, the processor 120 may change a calculation sequence of the gradient vector by reflecting the transposition from the horizontal gradient and the vertical gradient, when the image block needs to be transposed.

FIGS. 4A and 4B are diagrams illustrating a feature dimension reduction of a gradient vector according to an example embodiment of the present disclosure.

The processor 120 may reduce a feature dimension of the gradient vector of c×1 using an eigen vector of c'×c, as illustrated in FIG. 4A. For example, the processor 120 may obtain a gradient vector of c'×1 of which a feature dimension is reduced through multiplication between the eigen vector of c'×c and the gradient vector of c×1.

FIG. 4B illustrates an example of a gradient vector Gradient vector' of which a feature dimension is reduced.

The eigen vector may be created through a principal component analysis method by the external server, and the electronic apparatus 100 may receive the eigen vector from the external server, and store the eigen vector in the storage 110. For example, the external server may create a gradient vector of each of 10,000 first sample image blocks. A method of creating the gradient vector is the same as the method described above. Here, the external server may decide directivity of each of the first sample image blocks, transpose the first sample image blocks based on the decided directivity, and calculate gradient vectors for the transposed first sample image blocks. Then, the external server may calculate an eigen vector by applying the principal component analysis method to each of a plurality of calculated sample gradient vectors.

However, the present disclosure is not limited thereto, and the processor 120 may also directly create the eigen vector through the principal component analysis method. In this case, the storage 110 may store a plurality of first sample image blocks.

Hereinafter, a case of using a gradient vector of which a feature dimension is reduced is described for convenience of explanation. However, the reduction of the feature dimension as described above is an optional operation, and the following operations may thus be performed without reducing the feature dimension of the gradient vector.

Figure 5B:
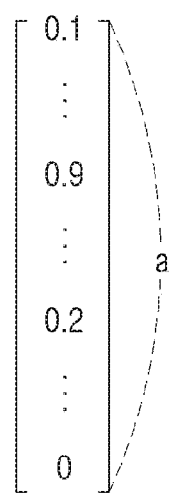

FIGS. 5A and 5B are diagrams illustrating an example search of a filter using an index matrix according to an example embodiment of the present disclosure.

The storage 110 may store an index matrix of a×c' as illustrated in FIG. 5A. The index matrix may include a index vectors of 1×c'. Here, the index vectors represent characteristics of an image block, and may also be called classes or groups. FIG. 5A illustrates the index matrix including the index vectors indicating characteristics for each of a classes or groups into which the characteristics of the image block are divided.

The processor 120 may perform multiplication between the index matrix of a×c' and the gradient vector of c'×1 of which the feature dimension is reduced, and calculate a correlation vector of a×1 as illustrated in FIG. 5B. Each row of the correlation vector indicates a correlation of an image block to each class or group.

The higher the number in the correlation vector, the higher the correlation. For example, in the case in which 0.9 is the largest number in FIG. 5B, the processor 120 may decide that the image block has characteristics of a class or a group corresponding to 0.9.

The index matrix may be created by the external server, and the electronic apparatus 100 may receive the index matrix from the external server and store the index matrix in the storage 110. The external server may calculate a index vectors that may represent a plurality of sample gradient vectors calculated from a plurality of first sample image blocks using a K-SVD or K-Means algorithm, which is one of unsupervised learning methods. The external server may create the index matrix including the a index vectors.

However, the present disclosure is not limited thereto, and the processor 120 may also calculate a index vectors that may represent a plurality of sample gradient vectors calculated from a plurality of first sample image blocks.

In addition, although a case in which the characteristics of the image block are divided into the a classes or groups is described hereinabove, the characteristics of the image block are not limited thereto, but may also be divided into another number of classes or groups. However, hereinafter, the case in which the characteristics of the image block are divided into the a classes or groups is described for convenience of explanation. In addition, the index vectors, the classes, and the groups are used together hereinabove, but a case in which the classes are used as a concept indicating the characteristics of the image block and the index vectors indicate each class is described hereinafter.

Meanwhile, the numbers of classes or groups may be changed depending on a kind of filters. For example, in the case of the resolution enlarging filter, the characteristics of the image block may be divided into the a classes or groups, but in the case of the sharpen filter, the characteristics of the image block may be divided into classes or filters of which the number is different from a.

Figure 6A:
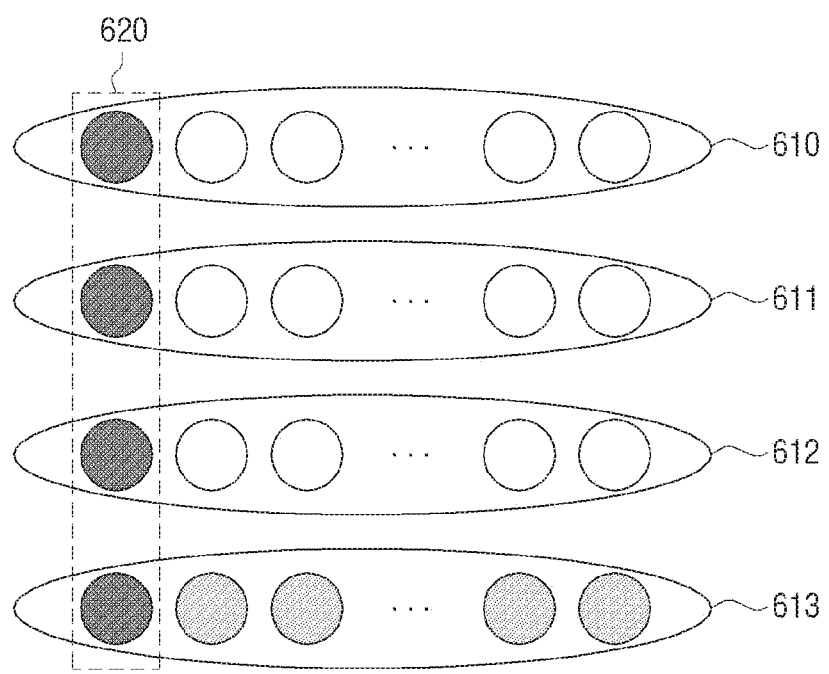

FIGS. 6A, 6B and 6C are diagrams illustrating an example method of reducing a search calculation amount of a filter according to an example embodiment of the present disclosure.

FIG. 6A is a diagram illustrating that a plurality of classes are grouped into four groups, and classes 620 representing each group may be designated in each group 610, 611, 612, and 613. FIG. 6B illustrates a first index matrix Index Matrix 1 including a plurality of index vectors corresponding to the classes 620 representing each group. FIG. 6C illustrates a second index matrix Index Matrix 2 including a plurality of index vectors corresponding to classes included in one of the four groups. That is, the number of second index matrices is the same as that of groups.

The first index matrix and the second index matrix may be created by the external server, and the electronic apparatus 100 may receive the first index matrix and the second index matrix from the external server and store the first index matrix and the second index matrix in the storage 110. The external server may perform grouping on a index vectors by a k-means clustering method, or the like, and determine index vectors representing each group. However, the present disclosure is not limited thereto, and the external server may also calculate representative index vectors representing each group. In this case, the representative index vectors may not coincide with all the index vectors in the corresponding group.

However, the present disclosure is not limited thereto, and the processor 120 may also calculate the first index matrix and the second index matrix by the method described above and store the first index matrix and the second index matrix in the storage 110.

The processor 120 may perform multiplication between a first index matrix of 4×c' and a gradient vector of c'×1 of which a feature dimension is reduced, and calculate correlations to each group. The processor 120 may obtain one group based on the largest correlation of the correlations to each group. The processor 120 may perform multiplication between a second index matrix of b×c' corresponding to the obtained group and the gradient vector of c'×1 of which the feature dimension is reduced, and calculate correlations to each of classes included in the obtained group.

In this case, calculation of correlations to classes except for three representative classes among b×3 classes included in the other groups except for the obtained group is not performed, and accuracy may be reduced as compared with FIGS. 5A and 5B, but a calculation speed may be improved.

In the case of reducing the number of groups, the accuracy may be further improved. The calculation speed may be further improved by increasing the number of groups.

Figure 7A:
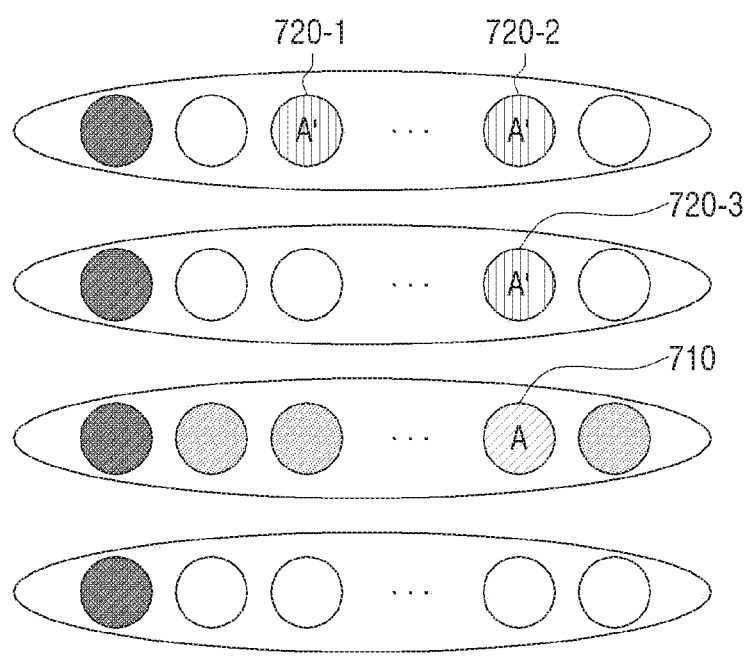

FIGS. 7A and 7B are diagrams illustrating an example method of reducing a search calculation amount of a filter according to another example embodiment of the present disclosure. For example, the method of FIGS. 7A and 7B is a method of selecting a class having a higher correlation through additional calculation after the method of FIGS. 6A, 6B and 6C is completely executed.

The processor 120 may obtain a class A 710 of a third group as a class of which a correlation to an image block is highest, as a calculation result of the correlations to the second index matrix, as illustrated in FIG. 7A.

The storage 110 may store a third index matrix Index Matrix 3 for the class A 710, as illustrated in FIG. 7B. The third index matrix may include a plurality of index vectors corresponding to classes A' 720-1, 720-2, and 720-3 included in groups different from a group of the class A 710 and having characteristics similar to those of the class A 710. In addition, the storage 110 may store third index matrices for each of the other classes that are not the class A 710. For example, the number of third index matrices may be the same as that of classes. In addition, sizes of a plurality of third index matrices may be different from one another.

The plurality of third index matrices may be created by the external server or be created by the processor 120.

The processor 120 may perform multiplication between a third index matrix of 3×c' and a gradient vector of c'×1 of which a feature dimension is reduced, and calculate correlations to the classes A' 720-1, 720-2, and 720-3 having the characteristics similar to those of the class A 710.

A process of calculating correlations to the third index matrix may be added in the method of FIGS. 7A and 7B as compared with the method of FIGS. 6A, 6B and 6C, but accuracy may be improved.

Figure 8A:
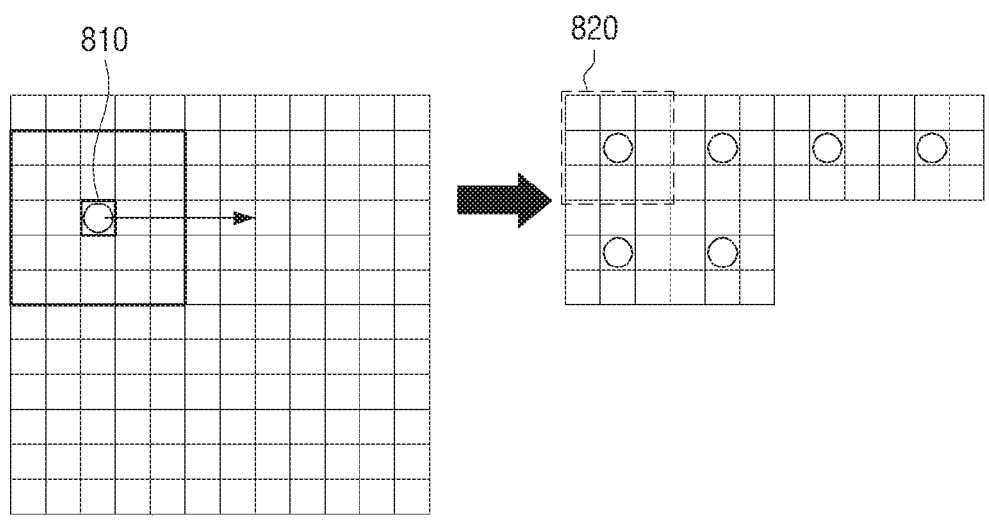
FIGS. 8A and 8B are diagrams illustrating an example method of applying a filter to an image block according to an example embodiment of the present disclosure.
Figure 8B:
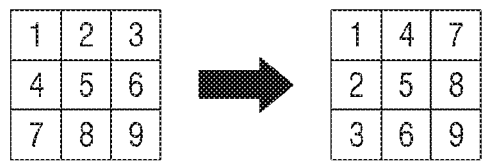

FIGS. 8A and 8B are diagrams illustrating an example method of applying a filter to an image block according to an example embodiment of the present disclosure. In FIG. 8A, an image block of 5×5 is illustrated for convenience of explanation.

The processor 120 may apply at least one of a plurality of filters to the image block based on the correlations calculated by the methods as illustrated in FIGS. 5A, 5B, 6A, 6B, 6C, 7A and 7B. For example, when the correlations to all the classes are calculated as illustrated in FIG. 5B, the processor 120 may obtain a first filter corresponding to a class of 0.9, a second filter corresponding to a class of 0.2, and a third filter corresponding to a class of 0.1 in a sequence of high correlations. Each of the plurality of filters may correspond to each of the plurality of classes. For example, in the case in which a classes are created depending on characteristics of the image block, one filter corresponding to each of the a classes is created, and a total of a filters may be created. A detailed description for a method of creating the filters is described below.

The processor 120 may convert the plurality of filters into one filter through the following Equation 2:

$$H_{fus} = \frac{C(1) \cdot H(1) + C(2) \cdot H(2) + C(3) \cdot H(3)}{C(1) + C(2) + C(3)}. \quad \text{[Equation 2]}$$

Here, H(1), H(2), and H(3) indicate the first filter, the second filter, and the third filter, respectively, and C(1), C(2), and C(3) indicate correlations of the image block to the first filter, the second filter, and the third filter, respectively.

However, the present disclosure is not limited thereto, and the processor 120 may also convert the plurality of filters into one filter without considering the correlations of each filter. In this case, the processor 120 may convert the plurality of filters into one filter by replacing C(1), C(2), and C(3) with 1 in Equation 2.

The processor 120 may obtain a final image block 820 for a target pixel 810 by applying the filter to the image block of 5×5, as illustrated in FIG. 8A. The right of FIG. 8A illustrates a final image block in which a total of six target pixels are image-processed, and is a view in which a resolution enlarging filter is applied. That is, one target pixel may be enlarged to a total of nine pixels.

The processor 120 may vectorize the image block and apply the filter to the image block. For example, the processor 120 may vectorize the image block of 5×5 and apply the filter to the image block of 5×5. That is, the processor 120 may obtain a final image block of 3×3 as illustrated at the right of FIG. 8A by performing multiplication between the filter and the vector. A method of vectorizing the image block and obtaining the final image block from the vector is the same as, or similar to, that described in FIG. 3E, and an overlapping description is thus omitted.

Although a case in which the resolution enlarging filter is used is described hereinabove, the present disclosure is not limited thereto. For example, the sharpen filter may be used. In this case, a resolution is maintained as it is, and a target pixel may be filtered to be sharpened based on a plurality of surrounding pixels. The sharpen filter may also be created through the artificial intelligence algorithm, and a sample image used in a learning process may be different from that in the resolution enlarging filter. A detailed description for this is provided below.

Meanwhile, the processor 120 may store information on whether or not the image block is transposed depending on directivity of the initial image block in the storage 110. When the final image block is obtained from the transposed image block, the processor 120 may again transpose the final image block based on the information stored in the storage 110 as illustrated in FIG. 8B.

Meanwhile, the processor 120 may obtain an additional image block by applying a non-learning-based filter to the image block, and update the final image block based on the largest correlation of the plurality of calculated correlations and the additional image block.

In detail, the processor 120 may update the final image block as represented by the following Equation 3:

$$Y1' = w \cdot Y1 + (1-w) \cdot Y2 \quad \text{[Equation 3]}$$
$$w = k \cdot \frac{\min(c, 1024)}{1024}.$$

Here, Y1' indicates the updated final image block, Y1 indicates the final image block, Y2 indicates an additional image block, w indicates a weight, c indicates the largest correlation of the plurality of calculated correlations, and k indicates a constant.

The non-learning-based filter may show better performance than that of the learning-based filter depending on a kind of filter and a kind of image characteristics. For example, a learning-based resolution enlarging filter shows excellent performance with respect to edge components of which image features are clear, but shows a noise component with respect to a flat region of which an image feature is unclear or shows low performance on a detail representation surface. Therefore, in the case in which the final image block by the learning-based resolution enlarging filter is updated with the additional image block by a non-learning-based resolution enlarging filter as represented by the following Equation 3, excellent filtering performance may be provided with respect to the flat region of which the image feature is unclear.

In addition, since a correlation between the image block and the learning-based resolution enlarging filter is considered as a weight in an update process, performance may be further improved. For example, in the case in which the image block is the flat region of which the image feature is unclear, correlations of the image block to the plurality of classes may be low. A sample image block including the flat region of which the image feature is unclear may be excluded from learning in the learning process.

Meanwhile, the processor 120 may also perform resolution enlargement with respect to a non-learned magnification by connecting the non-learning-based resolution enlarging filter to the learning-based resolution enlarging filter in series.

For example, the learning-based resolution enlarging filter is operated depending on only a learned resolution enlarging magnification, and may not be operated with respect to a non-learned resolution enlarging magnification. However, the processor 120 may enlarge a resolution using the learning-based resolution enlarging filter, and then perform resampling using the non-learning-based resolution enlarging filter to obtain a result depending on a desired resolution enlarging magnification.

Meanwhile, although a case in which three filters are weighted and summed in Equation 2 is described, the present disclosure is not limited thereto. For example, the processor 120 may use only one filter or use a plurality of filter and apply different weights to the plurality of filters.

In addition, the processor 120 may provide a final image block using one filter and a plurality of final image blocks using the plurality of filters to which different weights are applied, and may change Equation 2 depending on selection of a user. For example, the processor 120 may provide the final image block using one filter and the plurality of final image blocks using the plurality of filters depending on Equation 2, and in the case in which the user selects the final image block using one filter, the processor 120 may use one filter in the subsequent filter applying process.

Figure 9A:
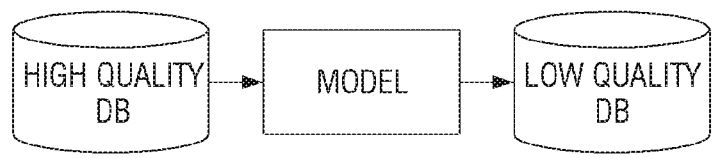
FIGS. 9A and 9B are diagrams illustrating an example learning method of a filter according to an example embodiment of the present disclosure.
Figure 9B:
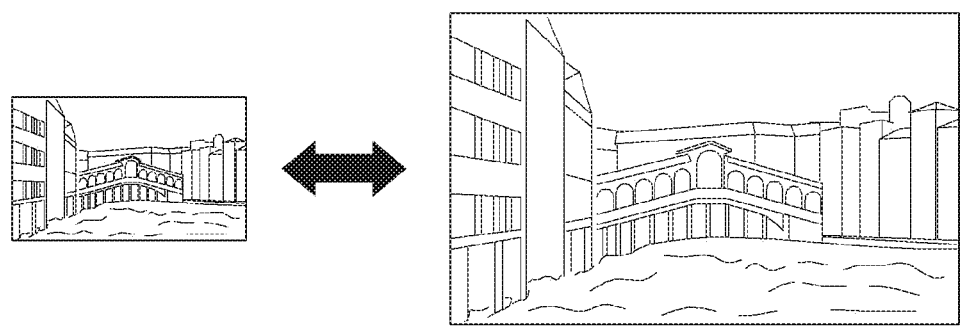

FIGS. 9A and 9B are diagrams illustrating an example learning method of a filter according to an example embodiment of the present disclosure. In FIGS. 9A and 9B, a learning method of a resolution enlarging filter and a case in which learning is performed in the external server are described for convenience of explanation.

The external server may store a high resolution image, as illustrated in FIG. 9A. The external server may read a plurality of second sample image blocks from the high resolution image, and obtain a plurality of first sample images by reducing a resolution of each of the plurality of second sample image blocks, as illustrated in FIG. 9B. The external server may store a plurality of second sample image blocks having a high resolution and a plurality of first sample image blocks corresponding to the plurality of second sample image blocks and having a low resolution. Here, the high resolution and the low resolution are to indicate relative states, and a low resolution image block may refer, for example, to an image block having a resolution lower than that of a high resolution image block.

The external server may obtain a plurality of sample gradient vectors from the plurality of first sample images. Here, the external server may perform transposition in consideration of directivity of the plurality of first sample images, but this is an optional operation.

The external server may obtain an eigen vector from the plurality of sample gradient vectors, and reduce feature dimensions of the plurality of sample gradient vectors. However, the external server may also perform learning without reducing the feature dimensions.

The external server may divide the plurality of sample gradient vectors of which the feature dimensions are reduced into a predetermined number of groups for each of characteristics of an image block, and obtain index vectors representing each group. Here, the index vectors representing each group may be the same as or may not be the same as one of the plurality of sample gradient vectors corresponding to the corresponding group. The external server may obtain an index matrix including a plurality of index vectors.

For convenience of explanation, a case in which the external server divides the characteristics of the image block into two groups having vertical directivity and horizontal directivity is described. In this case, the external server may obtain two index vectors representing each group, and obtain an index matrix including the two index vectors.

In addition, the external server may classify the first sample image blocks into one of two groups. For example, the external server may calculate first sample gradient vectors for the first sample image blocks, calculate correlations of the first sample image blocks to the two groups through multiplication between the index matrix and the first sample gradient vectors, and classify the first sample image blocks into a group having a higher correlation. The external server may perform the process as described above on all of the first sample image blocks. As a result, for example, 354,000 of 1,000,000 first sample image blocks may be classified into a group having horizontal directivity, and 646,000 of the of 1,000,000 first sample image blocks may be classified into a group having vertical directivity.

The external server may create a first filter by learning a relationship between the 354,000 first sample image blocks having the horizontal directivity and 354,000 second sample image blocks corresponding to the 354,000 first sample image blocks through the artificial intelligence algorithm. In addition, the external server may create a second filter by learning a relationship between the 646,000 first sample image blocks having the vertical directivity and 646,000 second sample image blocks corresponding to the 646,000 first sample image blocks through the artificial intelligence algorithm.

The index vector may be considered as an index indicating characteristics of one image block, and a filter corresponding to the index vector may be obtained by learning the first sample image blocks and the second sample image blocks corresponding to the first sample image blocks based on the characteristics of the image block corresponding to the corresponding index vector.

The external server may perform the learning through a method of minimizing and/or reducing an L2 norm error and a method of minimizing and/or reducing an L1 norm error. For example, the external server may calculate an image enlarging filter minimizing and/or reducing the L2 norm error through the following Equation 4:

$$M_k = \mathrm{argmin} \|X_k - M_k Y_k\|_2^2 + \lambda \|M_k\|_2^2$$

$$M_k = X_k Y_k^T (Y_k Y_k^T + \lambda I)^{-1} \qquad \text{[Equation 4]}$$

Here, K means a class, X indicates an image value of a high resolution sample image block, and Y indicates an image value of a low resolution sample image block.

However, this is only an example, and various learning methods may be used.

In addition, although a case of learning the high resolution image block and the low resolution image block is described in FIGS. 9A and 9B, the present disclosure is not limited thereto. For example, the external server may also obtain a sharpen filter or a blur filter by learning a blur image block and a sharp image block. In this case, a resolution of the image block may not be changed. Here, the blur image block means an image block having sharpness relatively lower than that of the sharp image block.

In addition, the electronic apparatus 100 rather than the external server may directly perform the learning. In this case, the storage 110 may store the first sample image blocks and the second sample image blocks, and the processor 120 may obtain an index matrix and a plurality of filters by performing the learning based on stored information. In addition, when the image block is input, the processor 120 may create a final image block by applying at least one filter to the input image block.

Meanwhile, it is described above that the transposition of the image block depending on the directivity decision result, the feature dimension reduction of the gradient vector, and the applying of the non-learning-based filter are optional operations. For example, the index matrix and the filters may be changed depending on whether or not the optional operations are performed.

For example, when the transposition of the image block depending on the directivity decision result is performed, an index matrix of a×c (in the case in which the feature dimension reduction is not performed) may be created. On the other hand, when the transposition of the image block depending on the directivity decision result is not performed, an index matrix of 2×a×c (in the case in which the feature dimension reduction is not performed) may be created. The reason is that in the case in which the image characteristics are divided into a, when the transposition is not performed, two cases of the horizontal directivity and the vertical directivity are divided, and the image characteristics are thus doubled.

When the feature dimension reduction of the gradient vectors is performed, an index matrix of a×c' (in the case in which the transposition is performed) may be created. On the other hand, when the feature dimension reduction of the gradient vectors is not performed, an index matrix of a×c (in the case in which the transposition is performed) may be created.

FIG. 10 is a flow diagram illustrating an example image transmitting operation according to an example embodiment of the present disclosure.

An external server 200 may, for example, and without limitation, be an apparatus providing an image to the electronic apparatus 100. In addition, the external server 200 may, for example, and without limitation, be a desktop PC, a laptop PC, a tablet, a smartphone, or the like, as well as a server, and may be any apparatus that may perform learning through an artificial intelligence algorithm and perform encoding.

The external server 200 may include a communicator and a processor, but it will hereinafter be described that the external server 200 performs an operation of the communicator and an operation of the processor, for convenience of explanation.

The external server 200 may obtain a low resolution image from a high resolution image (S1010). For example, the external server 200 may obtain a 4K video by downscaling a 8K video. A downscaling method may be any method.

In addition, the external server 200 may create filter information by learning the high resolution image and the low resolution image (S1020). Particularly, the external server 200 may obtain reconstruction information by learning a relationship between the high resolution image and the low resolution image through the artificial intelligence algorithm. Here, the reconstruction information may be information for reconstructing the high resolution image from the low resolution image.

For example, the external server 200 may divide the respective frames of the high resolution image into a plurality of first image blocks having a predetermined size, and may also divide the low resolution image into a plurality of second image blocks by the same method. In this case, the number of the plurality of first image blocks created from the high resolution image may be the same as that of the plurality of second image blocks created from the low resolution image. That is, each of the plurality of first image blocks created from the high resolution image may correspond to one of the plurality of second image blocks created from the low resolution image, and may be different in only a resolution from one of the plurality of second image blocks created from the low resolution image. In addition, the external server 200 may classify each of the plurality of first image blocks into one of a plurality of image patterns.

For example, the external server 200 may calculate gradient vectors from each of the plurality of first image blocks and classify each of the plurality of first image blocks into one of the plurality of image patterns based on the gradient vectors of each of the plurality of first image blocks. In this case, the external server 200 may transmit an index matrix including the gradient vectors corresponding to each of the plurality of image patterns to the electronic apparatus 100.

The external server 200 may obtain a plurality of filters each corresponding to the plurality of image patterns by learning a relationship between the plurality of first image blocks and the plurality of second image blocks through the artificial intelligence algorithm based on each of the plurality of image patterns. Here, a method of creating the plurality of filters overlaps that described in FIGS. 1A to 9B, and a description thereof is thus not repeated here.

In addition, the external server 200 may encode and compress the low resolution image (S1030). An encoding method is not particularly limited.

The external server 200 may transmit the encoded low resolution image and filter information to the electronic apparatus 100 (S1040). Here, the external server 200 may transmit not only the filter information but also the reconstruction information for reconstructing the high resolution image to the electronic apparatus 100. That is, the external server 200 may transmit the reconstruction information to the electronic apparatus 100, and the reconstruction information may include an index matrix and the plurality of filters. In addition, according to an example embodiment, the reconstruction information may further include an eigen vector. In addition, the reconstruction information may include a method of dividing the respective frame of the low resolution image into second image blocks having a predetermined size.

However, the present disclosure is not limited thereto, and the external server 200 may not perform separate encoding. In this case, the external server 200 may transmit a second image that is not encoded and the reconstruction information to the electronic apparatus 100.

The electronic apparatus 100 may receive the low resolution image and the reconstruction information from the external server 200.

Particularly, the electronic apparatus may receive the encoded low resolution image. The electronic apparatus 100 may decode the encoded low resolution image to reconstruct the low resolution image (S1050). A decoding method is not particularly limited as long as it corresponds to the encoding method of the external server 200.

The electronic apparatus 100 may obtain the second image upscaled from a first image based on the reconstruction information. Here, the reconstruction information may be obtained by learning a relationship between the first image and the second image through the artificial intelligence algorithm.

In addition, the electronic apparatus 100 may receive the filter information from the external server 200. The filter information may include the plurality of filters each corresponding to the plurality of image patterns. The electronic apparatus 100 may reconstruct the high resolution image by applying the filter information to the low resolution image (S1060).

For example, the electronic apparatus 100 may divide the low resolution image into the plurality of first image blocks, classify each of the plurality of first image blocks into one of the plurality of image patterns, apply a filter corresponding to the classified image pattern of each of the plurality of first image blocks among the plurality of filters to each of the plurality of first image blocks to obtain the plurality of second image blocks each upscaled from the plurality of first image blocks, and obtain the second image from the plurality of second image blocks.

Here, the electronic apparatus 100 may receive the index matrix including the gradient vectors corresponding to each of the plurality of image patterns from the external server 200, calculate the gradient vectors from each of the plurality of first image blocks, and classify each of the plurality of first image blocks into one of the plurality of image patterns based on the gradient vectors of each of the plurality of first image blocks.

Meanwhile, it has been described hereinabove that the electronic apparatus 100 receives the encoded low resolution image, but the electronic apparatus 100 may receive the low resolution image that is not encoded. In this case, the electronic apparatus 100 may not perform a decoding process.

It is difficult to transmit a 8K image by only a current encoding technology, but the 8K image may be transmitted through the method as described above. For example, the external server 200 may encode a 4K image, and transmit the encoded 4K image to the electronic apparatus 100. In addition, the electronic apparatus 100 may decode the received information to reconstruct the 4K image, and may create the 8K image from the 4K image using learning data learned through the artificial intelligence algorithm to derive the 8K image from the 4K image.

The reconstruction information transmitted from the external server 200 to the electronic apparatus 100 is only a tool for deriving the 8K image from the 4K image, and may be considered as being different from image information. For example, a capacity of the reconstruction information may be much smaller than a capacity when the 8K image is directly transmitted, and in the case of using the reconstruction information as described above, streaming of the 8K image may be possible.

Figure 11A:
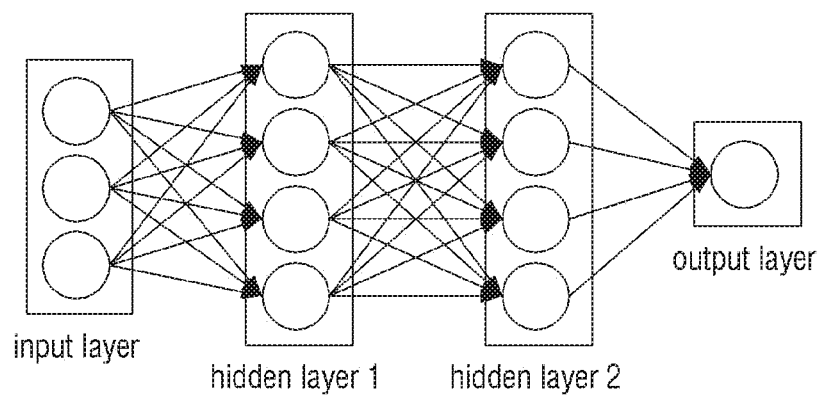
FIGS. 11A and 11B are diagrams illustrating an example learning method through an artificial intelligence algorithm according to an example embodiment of the present disclosure.
Figure 11B:
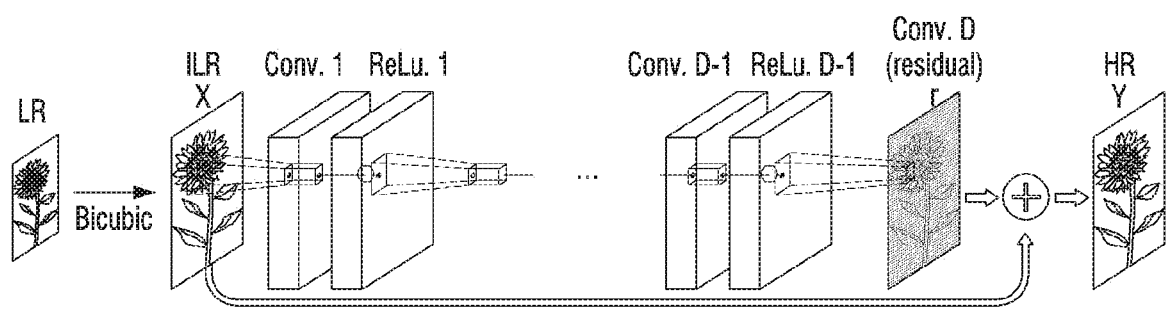

FIGS. 11A and 11B are diagrams illustrating an example learning method through an artificial intelligence algorithm according to an example embodiment of the present disclosure. Hereinabove, it has been described only that the filter is learned through the artificial intelligence algorithm. For example, the filter may have a matrix form of 3×3. However, the filter is not limited thereto, and may be an artificial intelligence model including a plurality of layers.

FIG. 11A is a diagram illustrating an example of an artificial intelligence model including an input layer, a hidden layer, and an output layer. The external server 200 may learn the artificial intelligence model by applying input data that is to be learned to the artificial intelligence model and comparing an output from the artificial intelligence model and output data corresponding to the input data with each other.

That is, the external server 200 may update the artificial intelligence model by applying a first sample image block to the artificial intelligence model as illustrated in FIG. 11A and comparing an output from the artificial intelligence model with a second sample image block corresponding to the first sample image block. The external server 200 may obtain the artificial intelligence model by repeating such a process, and the obtained artificial intelligence model may be used as one filter.

That is, the filter may be the artificial intelligence model including the plurality of layers as illustrated in FIG. 11A. It has been described in FIG. 11A that the filter including the plurality of layers is created, but a matrix of 3×3 may be learned by the same method. In this case, the filter may have a matrix form of 3×3. As described above, the filter may be created in various forms, and may be created using the artificial intelligence algorithm regardless of a form thereof.

Meanwhile, the artificial intelligence model is very simply illustrated in FIG. 11A, and is only an example. That is, the artificial intelligence model may include more layers than that of FIG. 11A.

FIG. 11B is a diagram for describing operations of the respective layers of FIG. 11A in more detail.

Data used for learning are an HR image and an LR image, and the external server 200 may obtain the LR image by downscaling the HR image. The external server 200 may obtain an ILR image by upscaling the LR image according to the related art, according to FIG. 11B. The ILR image may be an image of which a size is the same as that of the HR image, but a detail is lower than that of the HR image.

Then, the external server 200 may obtain a residual image by performing a plurality of convolutions, a plurality of rectified linear units (ReLus), and the like, on the ILR image. In addition, the external server 200 may update the plurality of convolutions, the plurality of ReLus, and the like, by comparing a synthesized image of the ILR image and the residual image with the HR image. The external server 200 may learn the artificial intelligence model by repeating the process described above using other HR images and LR images.

It has been described that the artificial intelligence model of FIG. 11B upscales the LR image using the related art for convenience of explanation, but the present disclosure is not limited thereto. For example, the artificial intelligence model itself may further include a pixel shuffler for performing the upscaling on the LR image.

In addition, it has been illustrated that the artificial intelligence model of FIG. 11B includes only a plurality of convolution layers and a plurality of ReLu layers, but it is only an example, and the artificial intelligence model may further include various types of layers such as a pooling layer, a BN layer, and the like.

Figure 12:
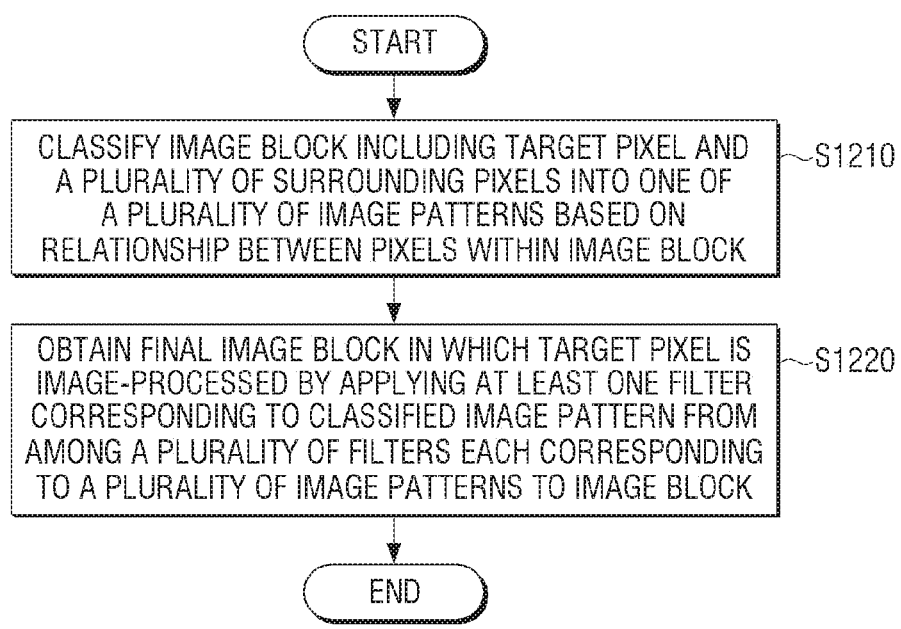
FIG. 12 is a flowchart illustrating an example method of controlling an electronic apparatus according to an example embodiment of the present disclosure.

FIG. 12 is a flowchart illustrating an example method of controlling an electronic apparatus according to an example embodiment of the present disclosure.

An image block including a target pixel and a plurality of surrounding pixels is classified into one of a plurality of image patterns based on a relationship between pixels within the image block (S1210). In addition, a final image block in which the target pixel is image-processed is obtained by applying at least one filter corresponding to the classified image pattern from among a plurality of filters each corresponding to the plurality of image patterns to the image block (S1220). The plurality of filters may be obtained by learning a relationship between a plurality of first sample image blocks and a plurality of second sample image blocks corresponding to the plurality of first sample image blocks through an artificial intelligence algorithm based on each of the plurality of image patterns.

The classifying (S1210) may include calculating a gradient vector from the image block, calculating correlations of the image block to each of a plurality of index vectors based on an index matrix including the plurality of index vectors and the gradient vector, and classifying the image block into one of the plurality of image patterns based on the calculated correlations, and the plurality of index vectors may be obtained based on a plurality of sample gradient vectors calculated from the plurality of first sample image blocks and may correspond to the plurality of image patterns, respectively.

In addition, in the calculating of the gradient vector, the gradient vector may be calculated from the image block when a strength of horizontal directivity of the image block is larger than that of vertical directivity of the image block, and the image block may be transposed and the gradient vector may be calculated from the transposed image block when the strength of the horizontal directivity of the image block is less than that of the vertical directivity of the image block.

Meanwhile, the method of controlling an electronic apparatus according to an example embodiment of the present disclosure may further include reducing a size of the gradient vector using an eigen vector, wherein in the calculating of the correlations, the correlations of the image block to each of the plurality of index vectors are calculated based on the gradient vector of which the size is reduced, and the eigen vector is created by applying a principal component analysis from the plurality of sample gradient vectors.

In addition, the calculating of the correlations may include calculating a first correlation of the image block to each of a plurality of index vector groups based on a first index matrix and the gradient vector, obtaining one of the plurality of index vector groups based on the first correlation, obtaining a second index matrix corresponding to the obtained index vector group from among a plurality of second index matrices, and calculating a second correlation of the image block to each of a plurality of index vectors included in the obtained index vector group based on the obtained second index matrix and the gradient vector, and in the obtaining (S1220) of the final image block, the final image block may be obtained by applying at least one of the plurality of filters to the image block based on the second correlation, the plurality of index vector groups may be obtained by dividing the plurality of index vectors into a predetermined number of groups, the first index matrix may include index vectors representing each of the plurality of index vector groups, and each of the plurality of second index matrices may include a plurality of index vectors corresponding to each of the plurality of index vector groups.

The calculating of the correlations may include obtaining one of the plurality of index vectors included in the obtained index vector group based on the second correlation, obtaining at least one additional index vector included in the others of the plurality of index vector groups and corresponding to the obtained index vector based on similar index vector information, and calculating a third correlation of the image block based on the obtained index vector, the obtained additional index vector, and the gradient vector, and in the obtaining (S1220) of the final image block, the final image block may be obtained by applying at least one of the plurality of filters to the image block based on the third correlation.

Meanwhile, the obtaining (S1220) of the final image block may include obtaining at least two of the plurality of filters based on a plurality of calculated correlations, calculating a final filter based on the at least two filters and correlations corresponding to each of the at least two filters, and obtaining the final image block by applying the calculated final filter to the image block.

In addition, the plurality of first sample image blocks may be images in which resolutions of the corresponding second sample image blocks are reduced, respectively, and in the obtaining (S1220) of the final image block, the final image block in which a resolution of the target pixel is enlarged may be obtained by applying at least one of the plurality of filters to the image block.

The method of controlling an electronic apparatus according to an example embodiment of the present disclosure may further include obtaining an additional image block in which the resolution of the target pixel is enlarged by applying a non-learning-based resolution enlarging technology to the image block and updating the final image block based on the largest correlation of the plurality of calculated correlations and the additional image block.

Meanwhile, in the calculating (S1210) of the gradient vector, horizontal gradients and vertical gradients for the target pixel and each of the plurality of surrounding pixels may be calculated, and the gradient vector may be calculated based on the horizontal gradients and the vertical gradients.

In addition, each of the plurality of filters may be obtained by obtaining a plurality of first sub-sample image blocks corresponding to one of the plurality of index vectors from among the plurality of first sample image blocks, obtaining a plurality of second sub-sample image blocks corresponding to the plurality of first sub-sample image blocks from among the plurality of second sample image blocks, and learning a relationship between the plurality of first sub-sample image blocks and the plurality of second sub-sample image blocks through the artificial intelligence algorithm.

According to the various example embodiments of the present disclosure as described above, the electronic apparatus may perform image processing in real time and be thus used in various applications, and may improve quality of the image processing as compared with non-learning-based image processing by performing learning-based image processing.

Meanwhile, the processor may apply the filter for each pixel of the image block. The processor may apply the filter for each sub-pixel of each pixel in the image block. The processor may apply the filter to only some of the sub-pixels. The processor may distinguish a chrominance component and a luminance component of each pixel in the image block from each other, and apply the filter to at least one of the chrominance component and the luminance component.

Meanwhile, according to an example embodiment of the present disclosure, the various example embodiments described above may be implemented by software including instructions stored in a machine-readable storage medium (for example, a computer-readable storage medium). A machine may be an apparatus that invokes the stored instruction from the storage medium and may be operated depending on the invoked instruction, and may include the electronic apparatus according to the disclosed example embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' may refer, for example to a storage medium that is tangible, and does not distinguish whether data are semi-permanently or temporarily stored on the storage medium.

In addition, according to an example embodiment of the present disclosure, the methods according to the diverse example embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, Play Store™). In the case of the online distribution, at least portions of the computer program product may be at least temporarily stored in a storage medium such as a memory of a server of a manufacturer, a server of an application store, or a relay server or be temporarily created.

In addition, according to an example embodiment of the present disclosure, the various example embodiments described above may be implemented in a computer or a computer-readable recording medium using software, hardware, or any combination of software and hardware. In some cases, example embodiments described in the present disclosure may be implemented by the processor itself. According to a software implementation, example embodiments such as procedures and functions described in the present disclosure may be implemented by separate software modules. Each of the software modules may perform one or more functions and operations described in the present disclosure.

Meanwhile, computer instructions for performing processing operations of the machines according to the diverse example embodiment of the present disclosure described above may be stored in a non-transitory computer-readable medium. The computer instructions stored in the non-transitory computer-readable medium allow a specific machine to perform the processing operations in the machine according to the diverse example embodiments described above when they are executed by a processor of the specific machine. The non-transitory computer-readable medium may refer, for example, to a medium that semi-permanently stores data therein and is readable by the machine. Examples of the non-transitory computer-readable medium may include a compact disk (CD), a digital versatile disk (DVD), a hard disk, a Blu-ray disk, a universal serial bus (USB), a memory card, a read only memory (ROM), or the like.

In addition, each of components (for example, modules or programs) according to the various example embodiments described above may include a single entity or a plurality of entities, and some of the corresponding sub-components described above may be omitted or other sub-components may be further included in the diverse example embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the diverse example embodiments may be executed in a sequential manner, a parallel manner, an iterative manner, or a heuristic manner, at least some of the operations may be performed in a different order or be omitted, or other operations may be added.

Although various example embodiments of the present disclosure have been illustrated and described hereinabove, the present disclosure is not limited to the abovementioned specific example embodiments, but may be variously modified by those skilled in the art to which the present disclosure pertains without departing from the true spirit and full scope of the present disclosure as disclosed in the accompanying claims. These modifications should also be understood to fall within the scope and spirit of the present disclosure.

What is claimed is:

1. A server comprising:
    a communicator comprising communication circuitry; and
    a processor configured to:
        obtain a second image by downscaling a first image,
        divide the first image into a plurality of first image blocks,
        process at least one of the first image blocks at least by transposing the at least one of the first image blocks such that the plurality of first image blocks have same directivity,
        obtain reconstruction information by learning a relationship between the first image and the second image through an artificial intelligence algorithm based on at least the plurality of first image blocks processed to have same directivity,
        encode the second image, and control the communicator to transmit the encoded second image and the reconstruction information to an electronic apparatus.

2. The server as claimed in claim 1, wherein the processor is further configured to:
classify each of the plurality of first image blocks into one of a plurality of image patterns,
divide the second image into a plurality of second image blocks corresponding to each of the plurality of first image blocks,
obtain a plurality of filters, of at least one resolution enlarging filter, each corresponding to the plurality of image patterns by learning a relationship between the plurality of first image blocks and the plurality of second image blocks through the artificial intelligence algorithm based on each of the plurality of image patterns, and
control the communicator to transmit the encoded second image and the plurality of filters to the electronic apparatus.

3. The server as claimed in claim 2, wherein the processor is configured to:
calculate gradient vectors from each of the plurality of first image blocks,
classify each of the plurality of first image blocks into one of the plurality of image patterns based on the gradient vectors of each of the plurality of first image blocks, and
transmit an index matrix including the gradient vectors corresponding to each of the plurality of image patterns to the electronic apparatus.

4. The server as claimed in claim 2, wherein the reconstruction information includes a method of dividing the second image into the plurality of second image blocks.

5. An electronic apparatus comprising:
a communicator comprising communication circuitry; and
a processor configured to:
receive an encoded first image, at least one resolution enlarging filter, and reconstruction information from a server through the communicator,
obtain a first image by decoding the encoded first image, and obtain a second image upscaled from the first image based on the reconstruction information,
wherein the at least one resolution enlarging filter and the reconstruction information are to be obtained by dividing the first image into a plurality of first image blocks, processing at least one of the first image blocks by transposing the at least one of the first image blocks such that the plurality of first image blocks have same directivity, and learning a relationship between the first image and the second image through an artificial intelligence algorithm based on the plurality of first image blocks processed to have same directivity.

6. The electronic apparatus as claimed in claim 5, wherein the processor is configured to:
receive a plurality of filters, of the at least one resolution enlarging filter, each corresponding to a plurality of image patterns from the server through the communicator,
classify each of the plurality of first image blocks into one of the plurality of image patterns,
apply a filter corresponding to the classified image pattern of each of the plurality of first image blocks among the plurality of resolution enlarging filters to each of the plurality of first image blocks to obtain a plurality of second image blocks each upscaled from the plurality of first image blocks, and
obtain the second image from the plurality of second image blocks.

7. The electronic apparatus as claimed in claim 6, wherein the processor is configured to:
receive an index matrix including gradient vectors corresponding to each of the plurality of image patterns from the server through the communicator,
calculate gradient vectors from each of the plurality of first image blocks, and
classify each of the plurality of first image blocks into one of the plurality of image patterns based on the gradient vectors of each of the plurality of first image blocks.

8. The electronic apparatus as claimed in claim 6, wherein the reconstruction information includes a method of dividing the first image into the plurality of first image blocks.

9. A method of controlling a server, comprising:
obtaining a second image by downscaling a first image;
dividing the first image into a plurality of first image blocks;
processing at least one of the first image blocks at least by transposing the at least one of the first image blocks such that the plurality of first image blocks have same directivity;
obtaining reconstruction information and at least one resolution enlarging filter by learning a relationship between the first image and the second image through an artificial intelligence algorithm based on at least the plurality of first image blocks processed to have same directivity,
encoding the second image; and
transmitting the encoded second image, the at least one resolution enlarging filter, and the reconstruction information to an electronic apparatus.

10. The method as claimed in claim 9, wherein the obtaining of the reconstruction information includes:
classifying each of the plurality of first image blocks into one of a plurality of image patterns;
dividing the second image into a plurality of second image blocks corresponding to each of the plurality of first image blocks; and
obtaining a plurality of filters, of the at least one resolution enlarging filter, each corresponding to the plurality of image patterns by learning a relationship between the plurality of first image blocks and the plurality of second image blocks through the artificial intelligence algorithm based on each of the plurality of image patterns, and
in the transmitting, the encoded second image and the plurality of filters are transmitted to the electronic apparatus.

11. The method as claimed in claim 10, wherein the classifying includes:
calculating gradient vectors from each of the plurality of first image blocks; and
classifying each of the plurality of first image blocks into one of the plurality of image patterns based on the gradient vectors of each of the plurality of first image blocks, and
in the transmitting, an index matrix including the gradient vectors corresponding to each of the plurality of image patterns is transmitted to the electronic apparatus.

12. The method as claimed in claim 10, wherein the reconstruction information includes a method of dividing the second image into the plurality of second image blocks.

13. A method of controlling an electronic apparatus, comprising:
- receiving an encoded first image, at least one resolution enlarging filter, and reconstruction information from a server;
- obtaining a first image by decoding the encoded first image; and
- obtaining a second image upscaled from the first image based on the reconstruction information
- wherein the reconstruction information and the at least one resolution enlarging filter are obtained by dividing the first image into a plurality of first image blocks, processing at least one of the first image blocks by transposing the at least one of the first image blocks such that the plurality of first image blocks have same directivity, and learning a relationship between the first image and the second image through an artificial intelligence algorithm based on the plurality of first image blocks processed to have same directivity.

14. The method as claimed in claim 13, wherein in the receiving, a plurality of filters of the at least one resolution enlarging filter are each corresponding to a plurality of image patterns are received from the server, and
the obtaining includes:
- classifying each of the plurality of first image blocks into one of the plurality of image patterns;
- applying a filter corresponding to the classified image pattern of each of the plurality of first image blocks among the plurality of resolution enlarging filters to each of the plurality of first image blocks to obtain a plurality of second image blocks each upscaled from the plurality of first image blocks; and
- obtaining the second image from the plurality of second image blocks.

15. The method as claimed in claim 14, wherein in the receiving, an index matrix including gradient vectors corresponding to each of the plurality of image patterns is received from the server, and
the classifying includes:
- calculating gradient vectors from each of the plurality of first image blocks, and
- classifying each of the plurality of first image blocks into one of the plurality of image patterns based on the gradient vectors of each of the plurality of first image blocks.

16. The method as claimed in claim 14, wherein the reconstruction information includes a method of dividing the first image into the plurality of first image blocks.

* * * * *